United States Patent
Fukunaga

(10) Patent No.: US 9,557,941 B2
(45) Date of Patent: Jan. 31, 2017

(54) PRINTING APPARATUS FOR PERFORMING PRINTING BASED ON DATA INCLUDING A PLURALITY OF PAGES

(71) Applicant: CANON KABUSHIKI KAISHA, Tokyo (JP)

(72) Inventor: Koji Fukunaga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/857,330

(22) Filed: Sep. 17, 2015

(65) Prior Publication Data

US 2016/0103638 A1  Apr. 14, 2016

(30) Foreign Application Priority Data

Oct. 14, 2014 (JP) ................. 2014-210167

(51) Int. Cl.
 *G06F 3/12* (2006.01)
 *G06K 15/00* (2006.01)

(52) U.S. Cl.
 CPC ........... *G06F 3/1211* (2013.01); *G06F 3/1253* (2013.01); *G06F 3/1298* (2013.01)

(58) Field of Classification Search
 CPC .... G06F 3/1205; G06F 3/1211; G06F 3/1236; G06F 3/1298; G06F 3/1253; H04N 1/00278; H04N 1/00283; H04N 1/33307; H04N 1/33376; H04N 2201/0015; H04N 2201/0034; H04N 2201/0074; H04N 2201/33328; H04N 2201/33364; H04N 2201/33378; G06G 15/50
 USPC ............ 358/1.9, 1.13, 1.15, 1.17, 1.18, 450; 399/16, 403; 700/223; 715/909
 See application file for complete search history.

(56) References Cited

U.S. PATENT DOCUMENTS

| | | | |
|---|---|---|---|
| 7,213,138 B2 | 5/2007 | Fukunaga et al. | |
| 7,764,394 B2 | 7/2010 | Omura | |
| 2002/0163665 A1* | 11/2002 | Iwata | G06F 3/1215 358/1.15 |
| 2013/0003124 A1* | 1/2013 | Yamazaki | G03G 15/655 358/1.15 |

FOREIGN PATENT DOCUMENTS

JP  2004-192395 A  7/2004

* cited by examiner

*Primary Examiner* — Gabriel Garcia
(74) *Attorney, Agent, or Firm* — Fitzpatrick, Cella, Harper & Scinto

(57) ABSTRACT

When sequentially receiving pages one by one from the outside and printing them at the time of printing based on printing data including a plurality of pages, a page count per copy when printing a plurality of copies is acquired, and data of a predetermined portion of a printing area are extracted from respective pages by the page count. It is determined whether the data of the extracted predetermined portion is identical between the respective pages. When it is determined that the data is identical, it is determined that printing of the printing data is not collation printing. When it is determined that the data is different, it is determined that printing of the printing data is collation printing.

15 Claims, 25 Drawing Sheets

100

F I G. 5A
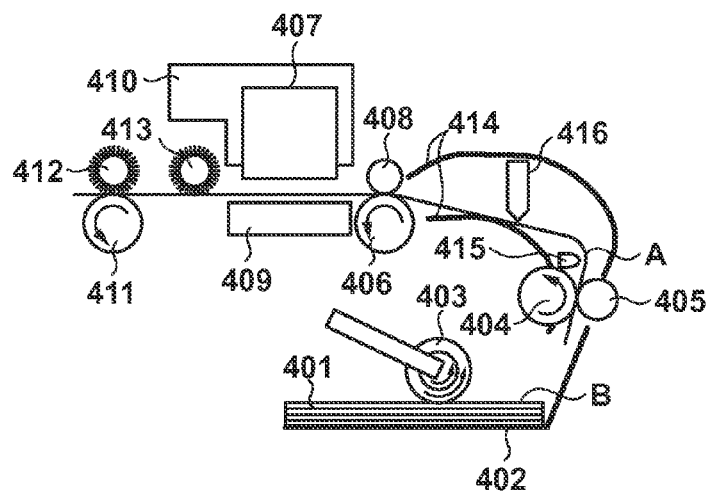
F I G. 5B
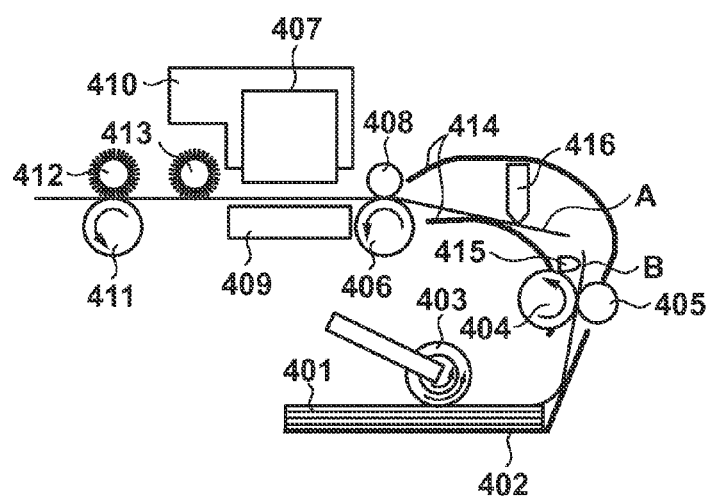
F I G. 5C
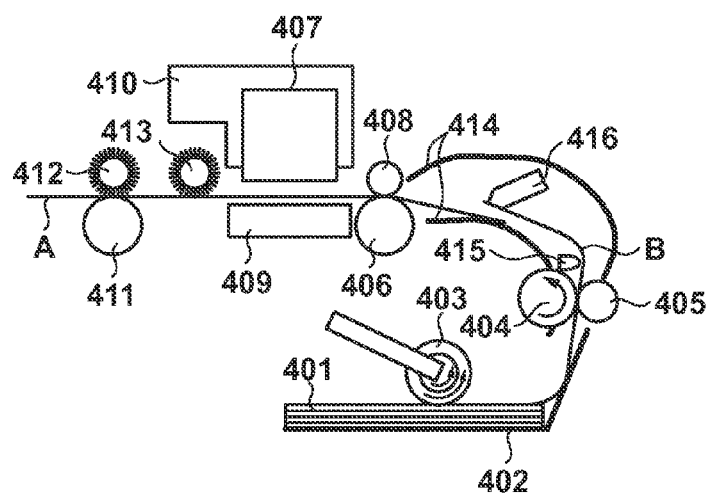

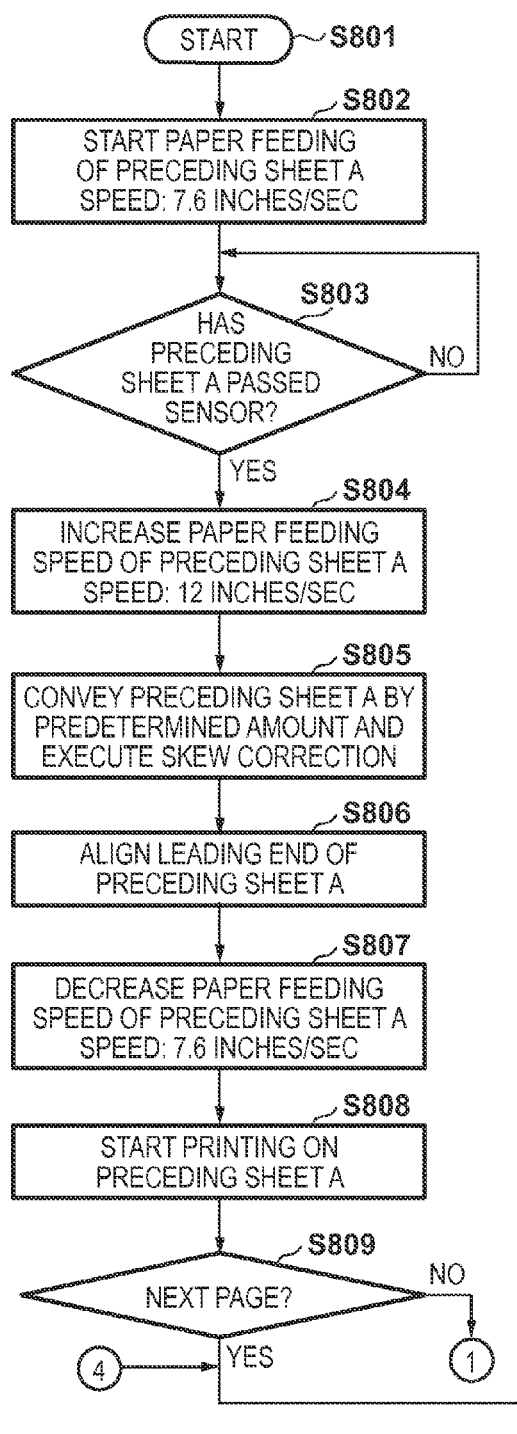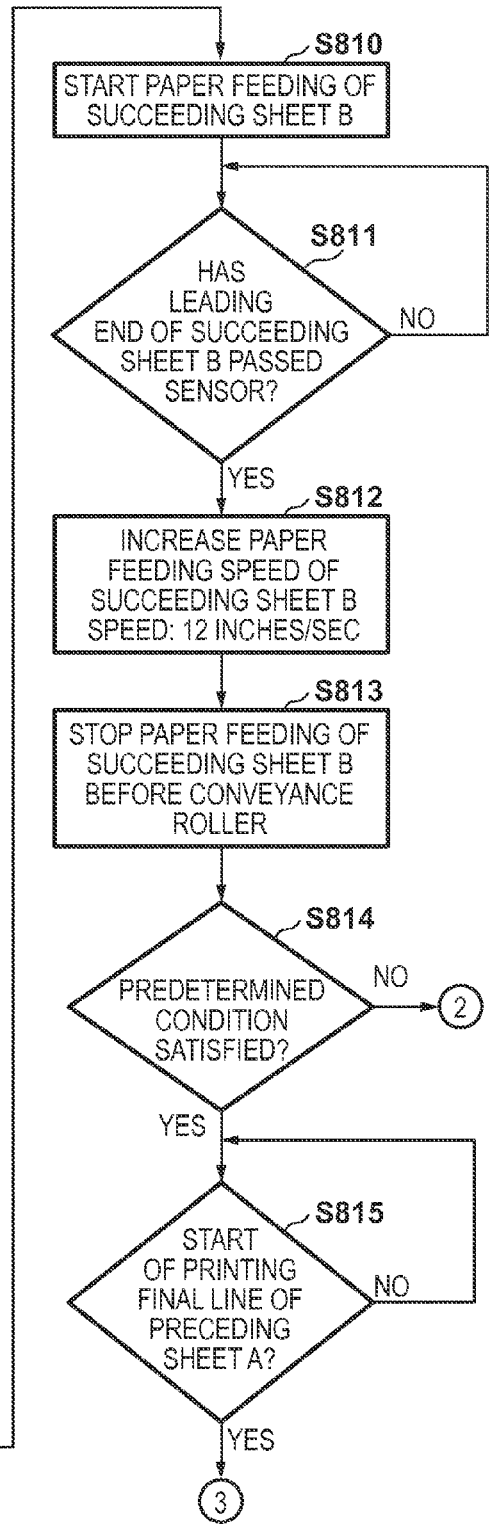
FIG. 8A

F I G. 14A
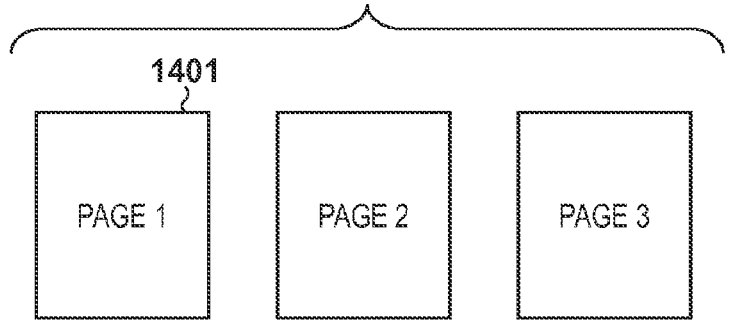
F I G. 14B
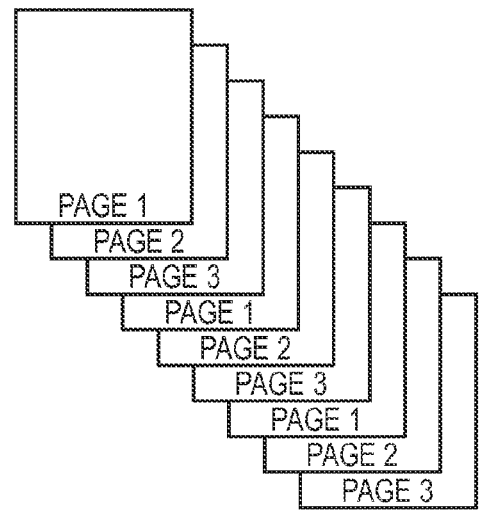
F I G. 14C
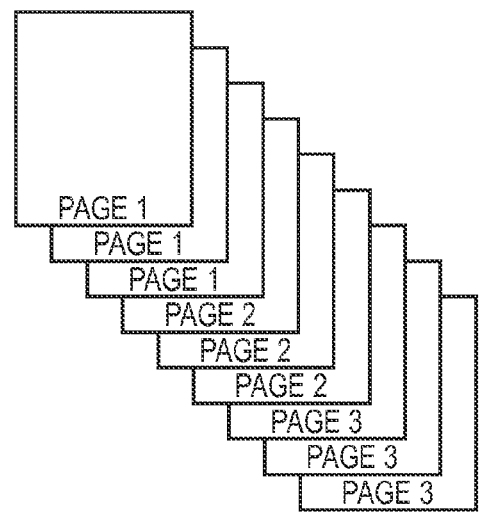

PRINTING APPARATUS FOR PERFORMING PRINTING BASED ON DATA INCLUDING A PLURALITY OF PAGES

BACKGROUND OF THE INVENTION

1. Field of the Invention

The present invention relates to a printing apparatus that prints on a printing medium based on printing data, a printing method, and a storage medium storing a program.

2. Description of the Related Art

When printing a plurality of copies, it is necessary to shorten the total time taken for printing, increase the productivity, and suppress the cost. A method of shortening the printing time is, for example, a method of reducing the total printing time by hastening the start time of paper feeding of the current printing material and the next printing material.

In some cases, collation printing is performed to print in a printing order of pages such as 1, 2, 3, 1, 2, 3, 1, 2, and 3 as a page configuration for the plurality of copies. In other cases, non-collation printing is performed to print in the printing order of pages 1, 1, 1, 2, 2, 2, 3, 3, and 3. When performing collation printing, a host apparatus analyzes the contents of printing data saved in the host apparatus, and determines whether to perform collation (Japanese Patent Laid-Open No. 2004-192395). When an image forming apparatus (to be referred to as a printing apparatus hereinafter) can receive printing data of one copy such as pages 1, 2, and 3 from the host apparatus and save them in the printing apparatus, it can print a plurality of copies in accordance with a collation printing notification from the host apparatus.

However, some printing apparatuses cannot save all printing data of one copy transmitted from the host apparatus owing to the limitation of the capacity of the buffer memory. Such a printing apparatus is configured to sequentially print printing data transmitted from the host apparatus. The host apparatus creates all printing data for the printing apparatus that performs sequential printing. If printing is collation printing, the host apparatus transmits printing data of, for example, 1, 2, 3, 1, 2, 3, 1, 2, and 3 to the printing apparatus. If printing is not collation printing, the host apparatus creates printing data of, for example, 1, 1, 1, 2, 2, 2, 3, 3, and 3, and transmits them to the printing apparatus. The method of analyzing printing data in the host apparatus, which is described in Japanese Patent Laid-Open No. 2004-192395, cannot be applied to such a printing apparatus.

That is, in the above-described case, the printing apparatus cannot recognize in advance whether the page configuration is designed for collation, and cannot perform appropriate printing corresponding to the page configuration.

SUMMARY OF THE INVENTION

An aspect of the present invention is to eliminate the above-mentioned problems with the conventional technology. The present invention provides a printing apparatus capable of recognizing a page configuration when sequentially receiving printing data from the outside and printing, a printing method, and a storage medium storing a program.

The present invention in one aspect provides a printing apparatus comprising: a printing unit configured to print based on printing data including a plurality of pages; an acquisition unit configured to, when the printing unit sequentially receives pages one by one from the outside and prints the pages, acquire a page count per copy when printing a plurality of copies by the printing unit; an extraction unit configured to, when the acquisition unit acquires the page count per copy, extract data of a predetermined portion of a printing area from respective pages by the page count; a page determination unit configured to determine whether the data of the predetermined portion extracted by the extraction unit is identical between the respective pages; and a printing determination unit configured to, when the page determination unit determines that the data are identical, determine that printing of the printing data is not collation printing, and when the page determination unit determines that the data are different, determine that printing of the printing data is collation printing.

According to the present invention, when sequentially receiving printing data from the outside and printing, a page configuration can be recognized.

Further features of the present invention will become apparent from the following description of exemplary embodiments with reference to the attached drawings.

BRIEF DESCRIPTION OF THE DRAWINGS

FIGS. 5A to 5C are views for explaining the successive overlapped conveyance operation;

FIGS. 8A and 8B are flowcharts showing processing of the successive overlapped conveyance operation;

FIGS. 14A to 14C are views showing printing data;

DESCRIPTION OF THE EMBODIMENTS

Figure 1:
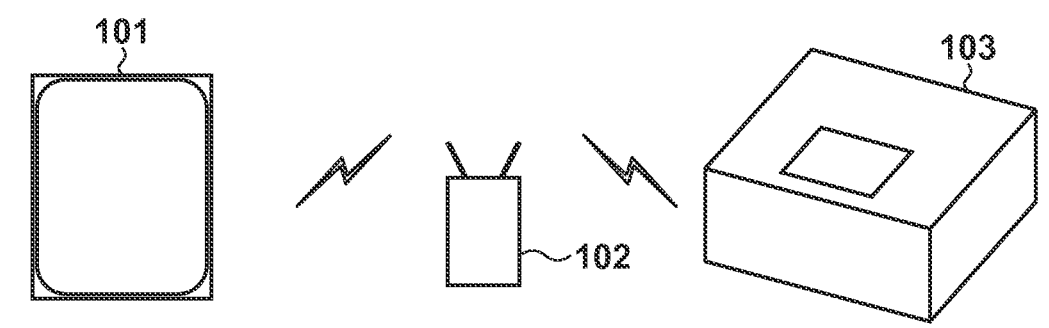
FIG. 1 is a view showing the arrangement of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[Arrangement of Printing System and Apparatus]

FIG. 1 is a view showing the arrangement of a printing system. A printing system 100 includes a tablet 101, an access point 102, and an image forming apparatus (printing apparatus) 103. The tablet 101 is an example of a host apparatus that causes the image forming apparatus 103 to print, and may be a general-purpose PC. The image forming apparatus 103 prints on a printing medium such as printing paper based on printing data received from the tablet 101. The image forming apparatus 103 prints on a printing medium by, for example, an electrophotographic method or an inkjet printing method. The image forming apparatus 103 may be a so-called MFP (MultiFunctional Peripheral) integrally having the scan function and the FAX function in addition to the print function.

In FIG. 1, the tablet 101 and the image forming apparatus 103 are connected by a wireless network so that they can communicate with each other. The tablet 101 has a function of generating printing data printable by the image forming apparatus 103 based on a text or image designated by a user, and transmitting the printing data to the image forming apparatus 103. The tablet 101 is connected to the access point 102 by a wireless LAN, and printing data from the tablet 101 is transmitted to the image forming apparatus 103 via the access point 102. Similarly, the image forming apparatus 103 is also connected to the access point 102 by a wireless LAN, and can receive printing data transmitted from the tablet 101.

In some cases, the image forming apparatus 103 temporarily saves all printing data transmitted from the tablet 101 in a storage device such as a hard disk, and executes printing based on the saved printing data. The image forming apparatus 103 of this type is often an expensive and high-end model. The image forming apparatus 103 of such a model can receive printing data equivalent to one copy from the tablet 101 and execute printing of a plurality of copies. Thus, the tablet 101 need not generate all printing data of a plurality of copies.

In other cases, the image forming apparatus 103 does not have the storage device and sequentially prints printing data transmitted from the tablet 101. Relatively low-cost image forming apparatuses often employ this method. When performing printing of a plurality of copies by the image forming apparatus 103 that performs sequential printing, the tablet 101 needs to generate all printing data of the plurality of copies and transmit them to the image forming apparatus 103.

In FIG. 1, the respective apparatuses are connected via the wireless network. However, for example, when the tablet 101 is a general-purpose PC, the host apparatus and the image forming apparatus 103 may be connected via a wired network without the access point 102.

Figure 2:
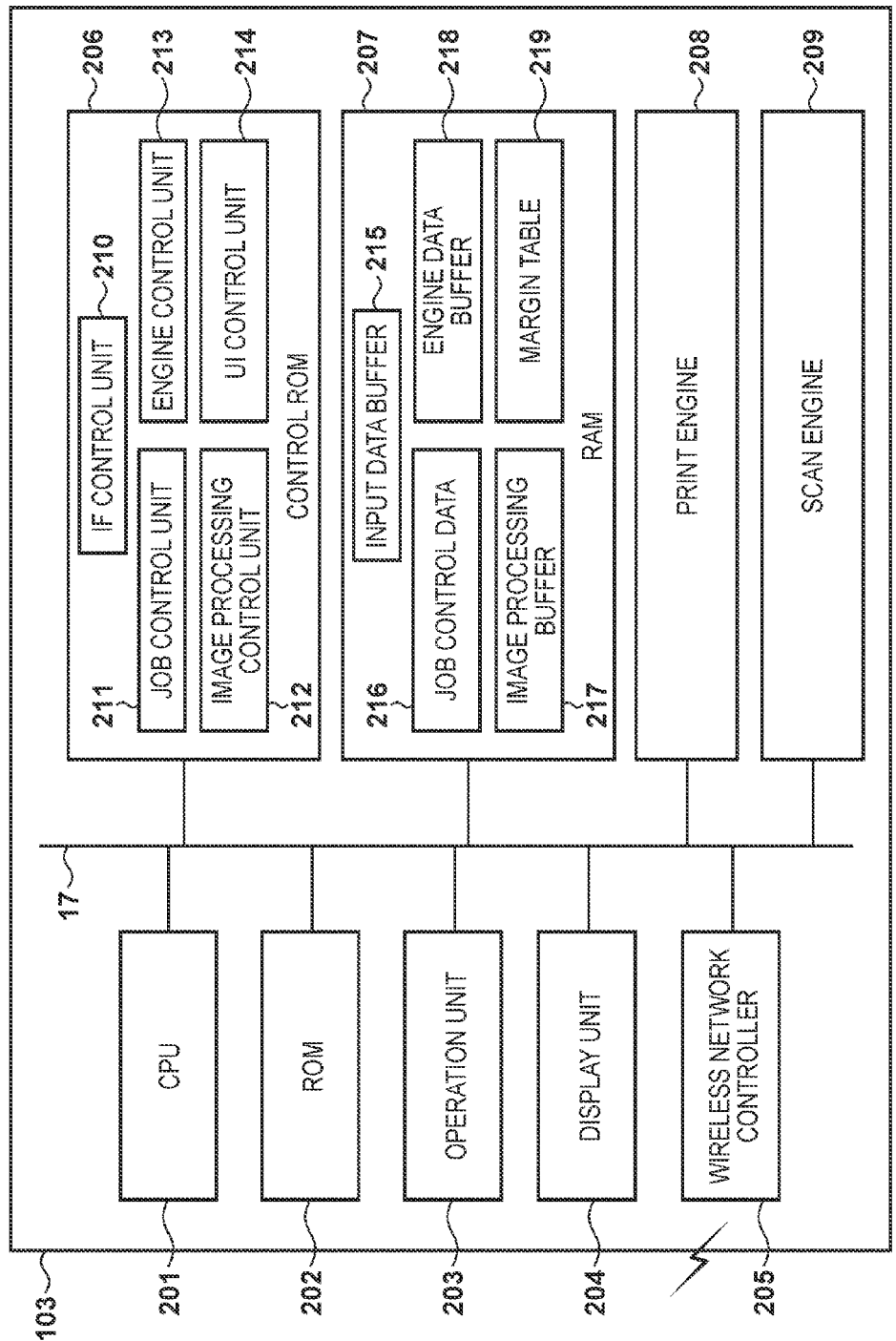
FIG. 2 is a block diagram showing the internal arrangement of an image forming apparatus.

FIG. 2 is a block diagram showing the internal arrangement of the image forming apparatus 103. A CPU 201 performs centralized control of the overall image forming apparatus 103 in accordance with a ROM 202 that stores programs regarding basic control of the apparatus and the like. A control ROM 206 stores programs regarding an IF control unit 210 that controls an interface (IF) with the outside, and a job control unit 211 that controls printing data. The control ROM 206 also stores programs regarding an image processing control unit 212 that converts printing data transmitted from the tablet 101 into data printable by a print engine 208. In addition, the control ROM 206 stores programs regarding an engine control unit 213 that performs printing by controlling the print engine 208, and a UI control unit 214 that performs user interface (UI) control for performing an operation and display with a user.

A RAM 207 is used as a work area when executing a program read out from the control ROM 206. The RAM 207 includes an input data buffer 215 at the time of data transmission/reception, an image processing buffer 217 that saves image data generated by the image processing control unit 212, and an engine data buffer 218 that saves engine data used for each engine. The RAM 207 stores job control data 216 for controlling printing data, and a margin table 219 that saves the leading end margin amount and trailing end margin amount of each page used when controlling the paper feeding operation of a printing sheet to be printed.

A wireless network controller 205 transmits/receives, to/from the tablet 101 via the wireless network, commands (for example, printing data) for executing printing. The wireless network controller 205 can transmit data read by a scanner to the outside. The wireless network controller 205 is constituted by a communication module and antenna for performing wireless network communication. In this embodiment, an IPP (Internet Print Protocol) capable of implementing print and scan services is used as a communication protocol in order to provide the print service and scan service. A communication protocol method used in IPP, and a request form and response form regarding the print service and scan service are defined as standard specifications.

A program for performing communication in accordance with the IPP communication protocol and the print service is written in the IF control unit 210 of the control ROM 206. A program for processing printing data (command) transmitted from the tablet 101 is written in the job control unit 211. A program for analyzing printing data transmitted from the tablet 101 in accordance with the data format, and converting the printing data into engine data for printing by the print engine 208 is written in the image processing control unit 212. The data conversion processing is called rendering. A program for executing printing of engine data converted by the image processing control unit 212 by using the print engine 208 is written in the engine control unit 213. The UI control unit 214 detects a user operation on an operation unit 203, and performs processing complying with this operation. A program for displaying, on a display unit 204, a message of which the user is notified is written in the UI control unit 214. The display unit 204 notifies the user of apparatus information, job information, and the like or displays them, and is constituted by an LCD, LED, or the like. Information of which the user is notified or which is displayed includes, for example, state information (for example, during printing, scanning state, or idle state), and a user interface screen synchronized with a user operation on the operation unit 203. The print engine 208 is a module for performing printing processing, and includes a print controller and printing mechanisms such as a printhead and drum. A scan engine 209 is a module for performing scanning, and includes a scan controller and scanner mechanisms such as an image sensor and optical carriage.

Figure 3:
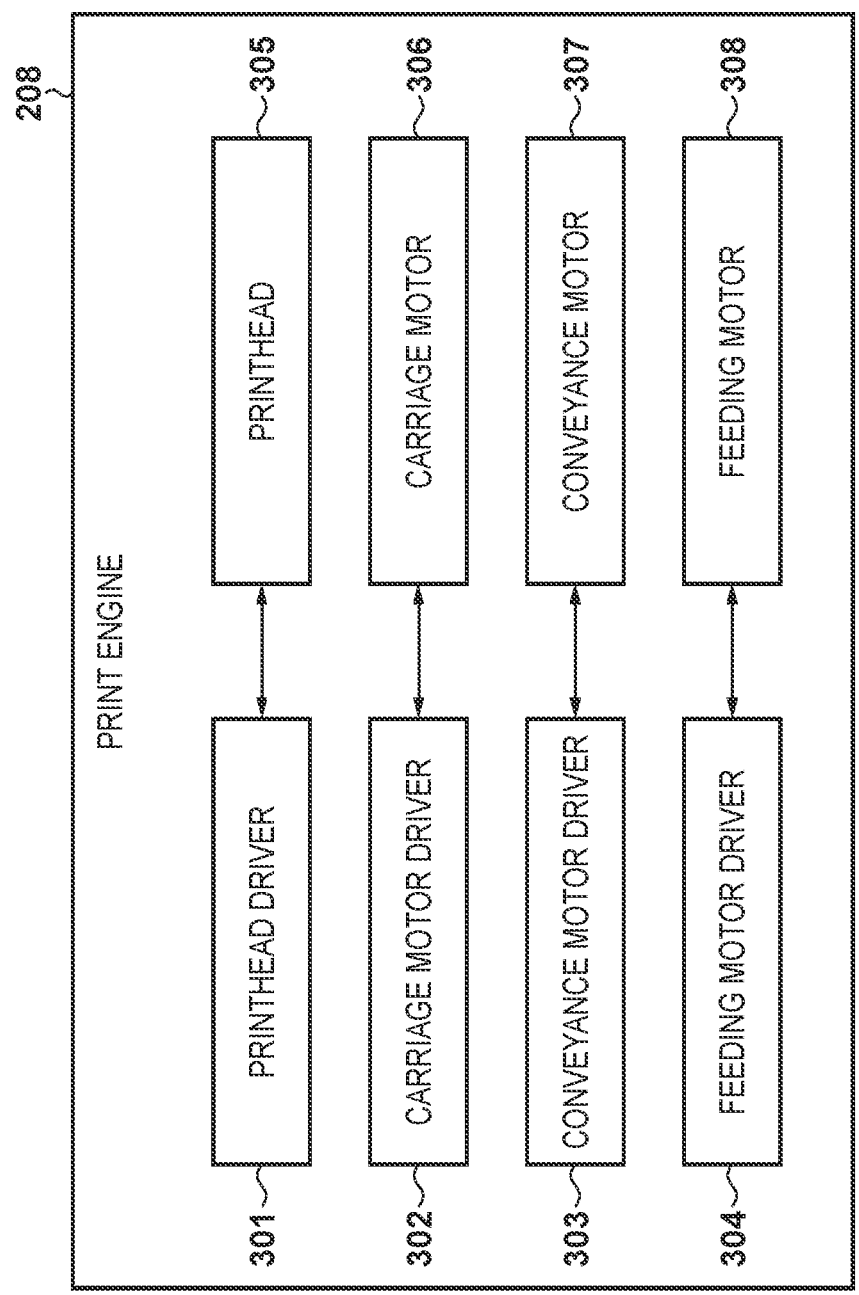
FIG. 3 is a block diagram showing the arrangement of a print engine.

FIG. 3 is a block diagram showing the arrangement of the print engine 208 in FIG. 2. A printhead driver 301 controls a printing operation such as discharge of ink droplets from a printhead 305. A carriage motor driver 302 controls driving of a carriage motor 306 that operates a carriage. A conveyance motor driver 303 controls driving of a conveyance motor 307. The conveyance motor 307 drives a conveyance roller 406 and a discharge roller 411. A feeding motor driver 304 controls driving of a feeding motor 308. The feeding motor 308 drives a pickup roller 403 and a feeding roller 404.

[Successive Overlapped Conveyance]

Figure 4A:
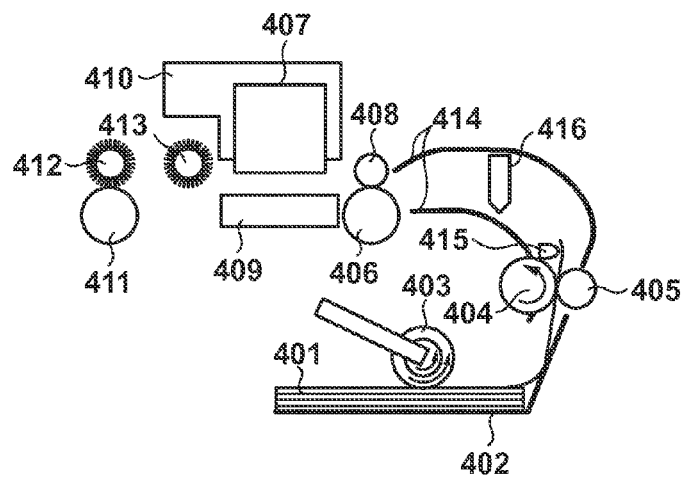
FIGS. 4A to 4C are views for explaining a successive overlapped conveyance operation.
Figure 4B:
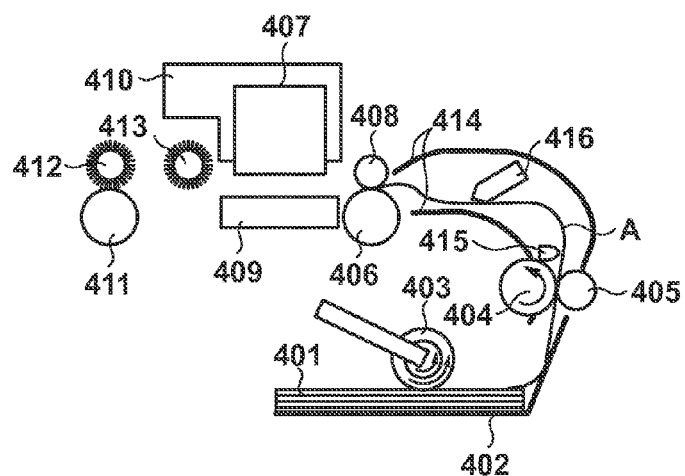
Figure 4C:
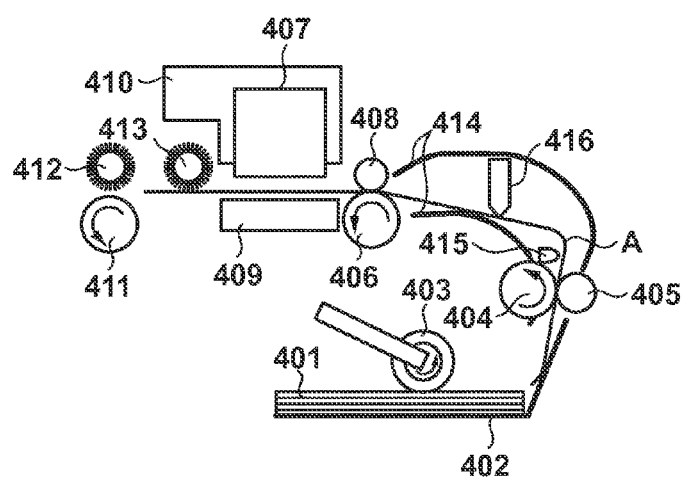

FIGS. 4A to 4C are views for explaining a successive overlapped conveyance operation. First, an arrangement regarding successive overlapped conveyance will be described with reference to FIG. 4A.

A plurality of printing sheets 401 are stacked on a feeding tray 402. The pickup roller 403 contacts the top printing sheet 401 stacked on the feeding tray 402, and picks up the printing sheet 401. The feeding roller 404 feeds the printing sheet 401 picked up by the pickup roller 403 downstream in the sheet conveyance direction. A feeding driven roller 405 is biased to the feeding roller 404, and nips and feeds the printing sheet 401 together with the feeding roller 404.

A conveyance roller 406 conveys the printing sheet 401 fed by the feeding roller 404 and the feeding driven roller 405 to a position where the printing sheet 401 faces a printhead 407. A pinch roller 408 is biased to the conveyance roller 406, and nips and conveys the printing sheet 401 together with the conveyance roller 406.

The printhead 407 prints on the printing sheet 401 conveyed by the conveyance roller 406 and the pinch roller 408. In this embodiment, the printhead 407 is a printhead of an inkjet printing method in which ink droplets are discharged from nozzles to print on the printing sheet 401. A platen 409 supports the lower surface of the printing sheet 401 at a position where the platen 409 faces the printhead 407. The printhead 407 is mounted on a carriage 410, and the carriage 410 moves reciprocally in directions (main scanning direction) perpendicular to the sheet conveyance direction (sub-scanning direction).

The discharge roller 411 discharges the printing sheet 401 having undergone printing by the printhead 407 from the apparatus. Spurs 412 and 413 rotate in contact with the printed surface of the printing sheet 401 having undergone printing by the printhead 407. The spur 412 is biased to the discharge roller 411, whereas the discharge roller 411 is not arranged for the spur 413 at a facing position. The spur 413 prevents floating of the printing sheet 401 and is also called a press spur.

A conveyance guide 414 guides the printing sheet 401 between a feeding nip portion formed by the feeding roller 404 and the feeding driven roller 405, and a conveyance nip portion formed by the conveyance roller 406 and the pinch roller 408. A sheet detection sensor 415 detects the leading end and trailing end of the printing sheet 401. The sheet detection sensor 415 is provided downstream of the feeding roller 404 in the sheet conveyance direction. A sheet press lever 416 is a lever for causing the margin of the leading end portion of a succeeding sheet to overlap the margin of the trailing end portion of a preceding sheet. The sheet press lever 416 is biased clockwise in FIGS. 4A to 4C by a spring.

Figure 7A:
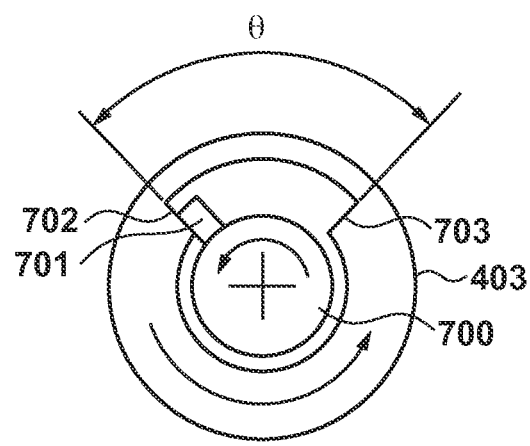
FIGS. 7A and 7B are views showing the structure of a pickup roller.
Figure 7B:
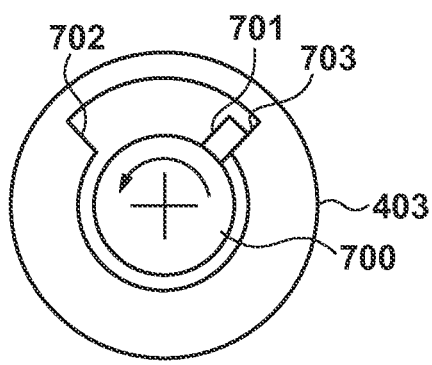

FIGS. 7A and 7B are views showing the structure of the pickup roller 403. The pickup roller 403 contacts the top printing sheet 401 stacked on the feeding tray 402, and picks up the printing sheet. A driving shaft 700 transfers driving of the feeding motor 308 to the pickup roller 403. When picking up the printing sheet 401, the driving shaft 700 and the pickup roller 403 rotate in directions indicated by arrows in FIG. 7A. A projection 701 is provided on the driving shaft 700. A recessed portion in which the projection 701 is fitted is formed in the pickup roller 403. When the projection 701 contacts a first surface 702 of the recessed portion of the pickup roller 403, as shown in FIG. 7A, driving of the driving shaft 700 is transferred to the pickup roller 403, and when the driving shaft 700 is driven, the pickup roller 403 is also driven. In contrast, when the projection 701 contacts a second surface 703 of the recessed portion of the pickup roller 403, as shown in FIG. 7B, driving of the driving shaft 700 is not transferred to the pickup roller 403, and even if the driving shaft 700 is driven, the pickup roller 403 is not driven. Also, when the projection 701 contacts neither the first surface 702 nor the second surface 703 and exists at 0 between the first surface 702 and the second surface 703, even if the driving shaft 700 is driven, the pickup roller 403 is not driven.

A printing operation by the print engine, in particular, paper feeding control of a paper feeding operation in successive overlapped conveyance will be explained in time series with reference to FIGS. 4A to 6C. When printing data is transmitted from an external apparatus such as the tablet 101 via the wireless network controller 205, the CPU 201 starts the printing operation based on printing data.

Referring to FIG. 4A, first, the feeding motor driver 304 drives the feeding motor 308 at low speed. As a result, for example, the pickup roller 403 rotates at 7.6 inches/sec. When the pickup roller 403 rotates, the top printing sheet 401 (preceding sheet A) stacked on the feeding tray 402 is picked up. The preceding sheet A picked up by the pickup roller 403 is conveyed by the feeding roller 404 rotating in the same direction as that of the pickup roller 403. The feeding roller 404 is also driven by the feeding motor 308.

When the sheet detection sensor 415 provided downstream of the feeding roller 404 detects the leading end of the preceding sheet A, the feeding motor driver 304 switches the feeding motor 308 to high-speed driving. As a result, for example, the pickup roller 403 and the feeding roller 404 rotate at 12 inches/sec.

Referring to FIG. 4B, by keeping the feeding roller 404 to rotate, the leading end of the preceding sheet A rotates the sheet press lever 416 clockwise. Further, by keeping the feeding roller 404 to rotate, the leading end of the preceding sheet A abuts against a conveyance nip portion formed by the conveyance roller 406 and the pinch roller 408. At this time, the conveyance roller 406 is at rest. Even after the leading end of the preceding sheet A abuts against the conveyance nip portion, the feeding roller 404 is rotated by a predetermined amount to align the printing sheet and correct a skew in a state in which the leading end of the preceding sheet A abuts against the conveyance nip portion. The skew correction operation is also called a registration operation.

Referring to FIG. 4C, after the end of the skew correction operation of the preceding sheet A, the conveyance motor driver 303 drives the conveyance motor 307. The conveyance roller 406 thus starts rotating. For example, the conveyance roller 406 conveys the preceding sheet A at 15 inches/sec. After the leading end of the preceding sheet A is aligned to a position where it faces the printhead 407, the printing operation is performed by discharging ink droplets from the printhead 407 based on printing data.

The image forming apparatus 103 is a serial type image forming apparatus in which the printhead 407 is mounted on the carriage 410 and can reciprocate in the main scanning direction. The image forming apparatus 103 repeats a conveyance operation of intermittently conveying the printing sheet 401 by every predetermined amount by the conveyance roller 406, and an image forming operation of discharging ink droplets from the printhead 407 while moving the carriage 410 on which the printhead 407 is mounted when the conveyance roller 406 is at rest. With this arrangement, the image forming apparatus 103 performs the printing operation on the printing sheet 401.

After the leading end of the preceding sheet A is aligned, the feeding motor driver 304 switches the feeding motor 308 to low-speed driving. As a result, for example, the pickup roller 403 and the feeding roller 404 rotate at 7.6 inches/sec. When the conveyance roller 406 intermittently conveys the printing sheet by every predetermined amount, the feeding motor 308 intermittently drives even the feeding roller 404. That is, when the conveyance roller 406 rotates, the feeding roller 404 also rotates, and when the conveyance roller 406 is at rest, the feeding roller 404 is also at rest. Since the rotational speed of the feeding roller 404 and pickup roller 403 is lower than that of the conveyance roller 406, the printing sheet is kept taut between the conveyance roller 406 and the feeding roller 404. The feeding roller 404 rotates together with the printing sheet conveyed by the conveyance roller 406.

When the feeding motor 308 intermittently drives the feeding roller 404, the driving shaft 700 is also driven. The rotational speed of the pickup roller 403 is lower than that of the conveyance roller 406. Hence, the pickup roller 403 rotates together with the printing sheet conveyed by the conveyance roller 406. That is, the pickup roller 403 rotates prior to the driving shaft 700. More specifically, the projection 701 of the driving shaft 700 is separated from the first surface 702 and contacts the second surface 703. Thus, even if the trailing end of the preceding sheet A passes the pickup roller 403, the second printing sheet 401 (succeeding sheet B) is not picked up soon. When the driving shaft 700 is driven for a predetermined time (time corresponding to 0), the projection 701 comes into contact with the first surface 702, and the pickup roller 403 starts rotating.

FIG. 5A is referred to. FIG. 5A shows a state in which the pickup roller 403 starts rotating and picks up the succeeding sheet B. A conveyance interval of a predetermined distance or more is necessary between the printing sheets 401 because of a factor such as a response characteristic for detecting the end portion of the printing sheet 401 by the sheet detection sensor 415. In this embodiment, the recessed portion of the pickup roller 403 is set to about 70° in order to ensure a predetermined conveyance interval until the sheet detection sensor 415 detects the leading end of the succeeding sheet B after detecting the trailing end of the preceding sheet A.

Referring to FIG. 5B, the succeeding sheet B picked up by the pickup roller 403 is conveyed to the feeding roller 404. At this time, the printhead 407 performs the image forming operation on the preceding sheet A based on printing data. When the sheet detection sensor 415 detects the leading end of the succeeding sheet B, the feeding motor 308 is switched to high-speed driving. Accordingly, for example, the pickup roller 403 and the feeding roller 404 rotate at 12 inches/sec.

Referring to FIG. 5C, the trailing end portion of the preceding sheet A is pressed down by the sheet press lever 416. A state in which the leading end portion of the succeeding sheet B overlaps the trailing end portion of the preceding sheet A can be formed by moving the succeeding sheet B at a speed higher than the speed at which the preceding sheet A moves downstream by the printing operation of the printhead 407. The preceding sheet A undergoes the printing operation based on printing data and is intermittently conveyed by the conveyance roller 406. After the sheet detection sensor 415 detects the leading end of the succeeding sheet B, the feeding roller 404 continuously rotates at 12 inches/sec, and the succeeding sheet B can catch up with the preceding sheet A.

Figure 6A:
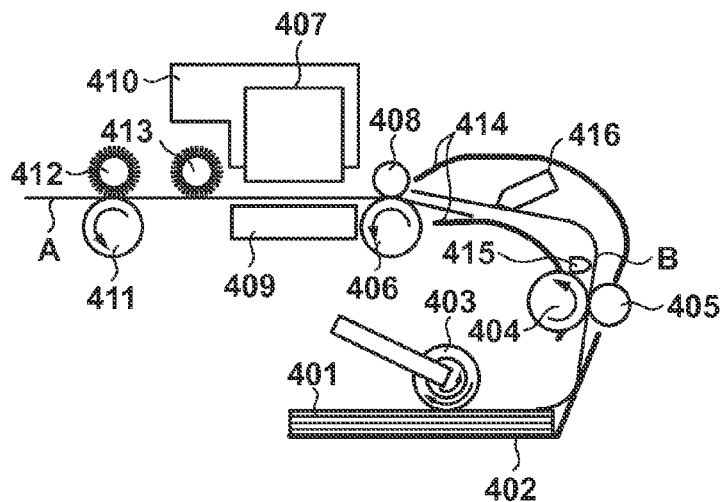
FIGS. 6A to 6C are views for explaining the successive overlapped conveyance operation.

Referring to FIG. 6A, after the state in which the leading end portion of the succeeding sheet B overlaps the trailing end portion of the preceding sheet A is formed, the succeeding sheet B is conveyed by the feeding roller 404 until the leading end stops at a predetermined position on the upstream of the conveyance nip portion. The position of the leading end of the succeeding sheet B is controlled based on the detection result of the sheet detection sensor 415. At this time, the printhead 407 performs the image forming operation on the preceding sheet A based on printing data.

Figure 6B:
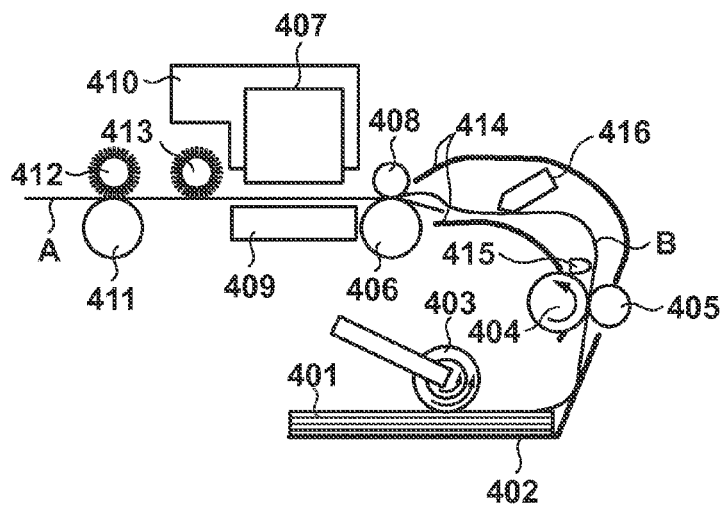

Referring to FIG. 6B, when the conveyance roller 406 is stopped in order to perform the image forming operation (ink discharge operation) of the final line of the preceding sheet A, the feeding roller 404 is driven to cause the leading end of the succeeding sheet B to abut against the conveyance nip portion, thereby performing the skew correction operation of the succeeding sheet B.

Figure 6C:
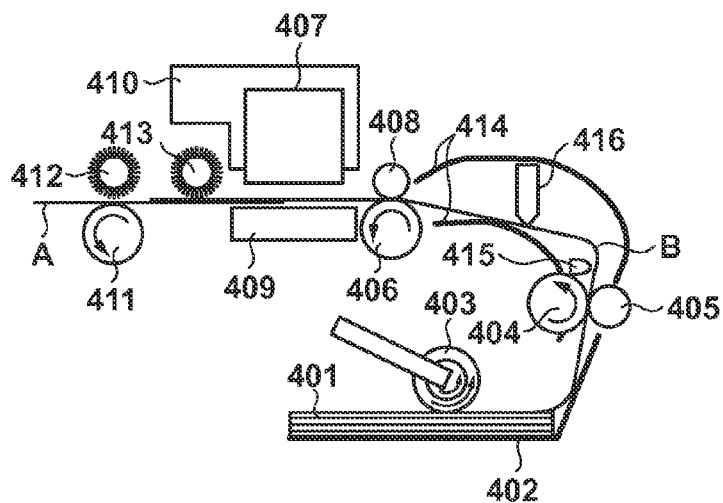

Referring to FIG. 6C, after the end of the image forming operation of the final line of the preceding sheet A, the conveyance roller 406 is rotated by a predetermined amount, and the leading end of the succeeding sheet B can be aligned while maintaining the state in which the succeeding sheet B overlaps the preceding sheet A. After that, the printhead 407 performs the printing operation on the succeeding sheet B based on printing data. When the succeeding sheet B is intermittently conveyed for the printing operation, the preceding sheet A is also intermittently conveyed and is discharged from the image forming apparatus 103 by the discharge roller 411 in the end.

After the leading end of the succeeding sheet B is aligned, the feeding motor driver 304 switches the feeding motor 308 to low-speed driving. Therefore, for example, the pickup roller 403 and the feeding roller 404 rotate at 7.6 inches/sec. When there is printing data subsequent to the succeeding sheet B, the image forming apparatus returns to the operation of FIG. 5A to perform the pickup operation for the third sheet.

Figure 8B:
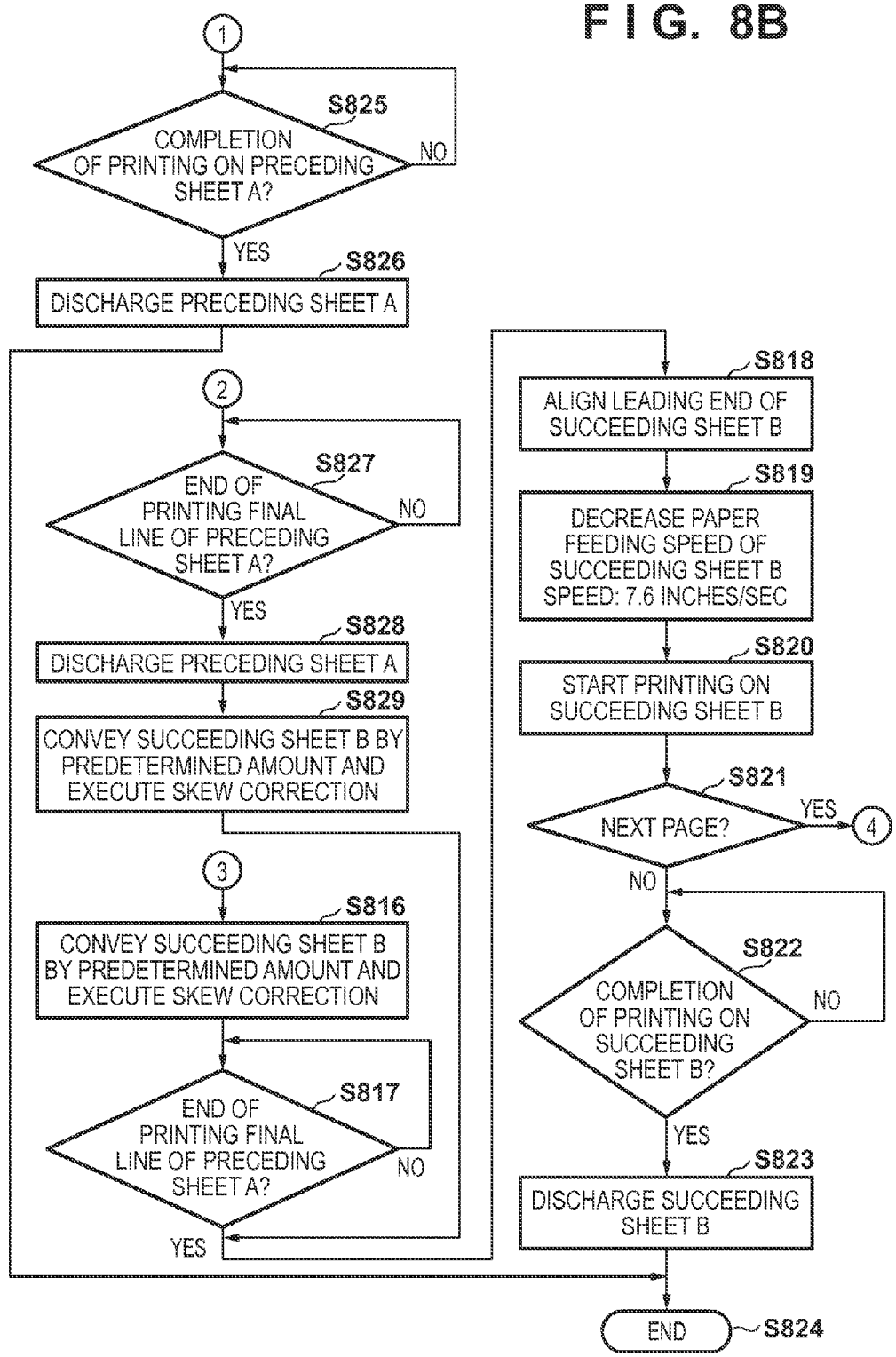

FIGS. 8A and 8B are flowcharts showing processing of the successive overlapped conveyance operation. The processing shown in FIGS. 8A and 8B are implemented by, for example, reading out a program from the ROM 202 and executing it by the CPU 201.

In step S801, when printing data is transmitted from an external apparatus such as the tablet 101 via the wireless network controller 205, the CPU 201 starts the printing operation. In step S802, the CPU 201 starts the feeding operation of the preceding sheet A. More specifically, the feeding motor driver 304 drives the feeding motor 308 at low speed. As a result, for example, the pickup roller 403 rotates at 7.6 inches/sec. The preceding sheet A is picked up by the pickup roller 403 and fed to the printhead 407 by the feeding roller 404.

In step S803, the CPU 201 determines, from the detection signal of the sheet detection sensor 415, whether the leading end of the preceding sheet A has been detected. If the CPU 201 determines that the leading end of the preceding sheet A has been detected, it controls the feeding motor driver 304 to drive the feeding motor 308 at high speed in step S804. Thus, for example, the pickup roller 403 and the feeding roller 404 rotate at 12 inches/sec. If the CPU 201 determines that the leading end of the preceding sheet A has not been detected, it repeats the processing in step S803.

In step S805, the CPU 201 performs the skew correction operation of the preceding sheet A by controlling the rotation amount of the feeding roller 404 after the sheet detection sensor 415 detects the leading end of the preceding sheet A, and causing the leading end of the preceding sheet A to abut against the conveyance nip portion.

In step S806, the CPU 201 aligns the leading end of the preceding sheet A based on the printing data. In step S807, the CPU 201 controls the feeding motor driver 304 to drive the feeding motor 308 at low speed. In step S808, the CPU 201 starts the printing operation on the preceding sheet A by discharging ink droplets from the printhead 407. More specifically, the printing operation on the preceding sheet A is performed by repeating the conveyance operation of intermittently conveying the preceding sheet A by the conveyance roller 406, and the image forming operation (ink discharge operation) of reciprocating the carriage 410 and discharging ink droplets from the printhead 407. The CPU 201 controls the feeding motor driver 304 to intermittently drive the feeding motor 308 at low speed in synchronism with the operation of intermittently conveying the preceding sheet A by the conveyance roller 406. Accordingly, for example, the pickup roller 403 and the feeding roller 404 intermittently rotate at 7.6 inches/sec.

In step S809, the CPU 201 determines whether there is printing data of the next page subsequent to the preceding sheet A. If the CPU 201 determines that there is no printing data of the next page, it advances to step S825. In step S825, the CPU 201 determines whether the printing operation on the preceding sheet A has been completed. If the CPU 201 determines that the printing operation on the preceding sheet A has been completed, it performs discharge control of the preceding sheet A in step S826, and ends the processing of FIGS. 8A and 8B in step S824. If the CPU 201 determines that the printing operation has not been completed, it repeats the processing in step S825.

If the CPU 201 determines in step S809 that there is printing data of the next page, it starts the feeding operation of the succeeding sheet B in step S810. More specifically, the CPU 201 controls the pickup roller 403 to pick up the succeeding sheet B, and the feeding roller 404 to feed the succeeding sheet B to the printhead 407. At this time, for example, the pickup roller 403 rotates at 7.6 inches/sec. Since the recessed portion of the pickup roller 403 is provided to be large with respect to the projection 701 of the driving shaft 700, as described above, a predetermined conveyance interval is provided between the preceding sheet A and the succeeding sheet B.

In step S811, the CPU 201 determines, from the detection signal of the sheet detection sensor 415, whether the leading end of the succeeding sheet B has been detected. If the CPU 201 determines that the leading end of the succeeding sheet B has been detected, it controls the feeding motor driver 304 to drive the feeding motor 308 at high speed in step S812. Thus, for example, the pickup roller 403 and the feeding roller 404 rotate at 12 inches/sec. If the CPU 201 determines that the leading end of the succeeding sheet B has not been detected, the processing in step S811 is repeated.

In step S813, the CPU 201 controls the rotation amount of the feeding roller 404 after detecting the leading end of the succeeding sheet B, and controls conveyance of the succeeding sheet B so that the leading end of the succeeding sheet B is positioned a predetermined amount before the conveyance nip portion. Here, the preceding sheet A is intermittently conveyed based on the printing data. An overlapped state in which the leading end portion of the succeeding sheet B overlaps the trailing end portion of the preceding sheet A is formed by continuously driving the feeding motor 308 at high speed by the CPU 201.

In step S814, the CPU 201 determines whether a predetermined condition (to be described later) has been satisfied. If the CPU 201 determines that the predetermined condition has been satisfied, it advances to step S815. If the CPU 201 determines that the predetermined condition has not been satisfied, it advances to step S827. The predetermined condition is the state of preceding and succeeding sheets in which the skew correction operation by abutment is performed on the succeeding sheet while maintaining the overlapped state.

If the CPU 201 determines in step S814 that the predetermined condition has been satisfied, it determines in step S815 whether printing of the final line of the preceding sheet A has started. If the CPU 201 determines that printing of the final line of the preceding sheet A has not started, it repeats the processing in step S815. If the CPU 201 determines that printing of the final line of the preceding sheet A has started, it performs the skew correction operation of the succeeding sheet B by causing the leading end of the succeeding sheet B to abut against the conveyance nip portion while maintaining the overlapped state in step S816. In step S817, the CPU 201 determines whether printing of the final line of the preceding sheet A has ended. If the CPU 201 determines that printing of the final line of the preceding sheet A has not ended, it repeats the processing in step S817. If the CPU 201 determines that printing of the final line of the preceding sheet has ended, it aligns the leading end of the succeeding sheet B while maintaining the overlapped state in step S818.

If the CPU 201 determines in step S814 that the predetermined condition has not been satisfied, the CPU 201 determines in step S827 whether printing of the final line of the preceding sheet A has ended. If the CPU 201 determines that printing of the final line of the preceding sheet A has not ended, it repeats the processing in step S827. If the CPU 201 determines that printing of the final line of the preceding sheet A has ended, it performs the discharge operation of the preceding sheet A in step S828. During this operation, the feeding motor 308 is not driven, and the leading end of the succeeding sheet B is stopped at a position a predetermined amount before the conveyance nip portion. To the contrary, the preceding sheet A is discharged, canceling the overlapped state. In step S829, the CPU 201 performs the skew correction operation of the succeeding sheet B by causing the leading end of the succeeding sheet B to abut against the conveyance nip portion. In step S818, the CPU 201 cancels the overlapped state and aligns the leading end of the succeeding sheet B.

In step S819, the CPU 201 controls the feeding motor driver 304 to drive the feeding motor 308 at low speed. In step S820, the CPU 201 starts the printing operation by discharging ink droplets from the printhead 407 to the succeeding sheet B. More specifically, the printing operation on the succeeding sheet B is performed by repeating the conveyance operation of intermittently conveying the succeeding sheet B by the conveyance roller 406, and the image forming operation (ink discharge operation) of reciprocating the carriage 410 and discharging ink droplets from the printhead 407. The CPU 201 controls the feeding motor driver 304 to intermittently drive the feeding motor 308 at low speed in synchronism with the operation of intermittently conveying the succeeding sheet B by the conveyance roller 406. As a result, for example, the pickup roller 403 and the feeding roller 404 intermittently rotate at 7.6 inches/sec.

In step S821, the CPU 201 determines whether there is printing data of the next page subsequent to the succeeding sheet B. If the CPU 201 determines that there is printing data of the next page, it advances to step S810. If the CPU 201 determines that there is no printing data of the next page, the CPU 201 determines in step S822 whether printing of the succeeding sheet B has been completed. If the CPU 201 determines that printing of the succeeding sheet B has not been completed, it repeats the processing in step S822. If the CPU 201 determines that printing of the succeeding sheet B has been completed, it performs the discharge operation of the succeeding sheet B in step S823, and ends the processing of FIGS. 8A and 8B in step S824.

Figure 9A:
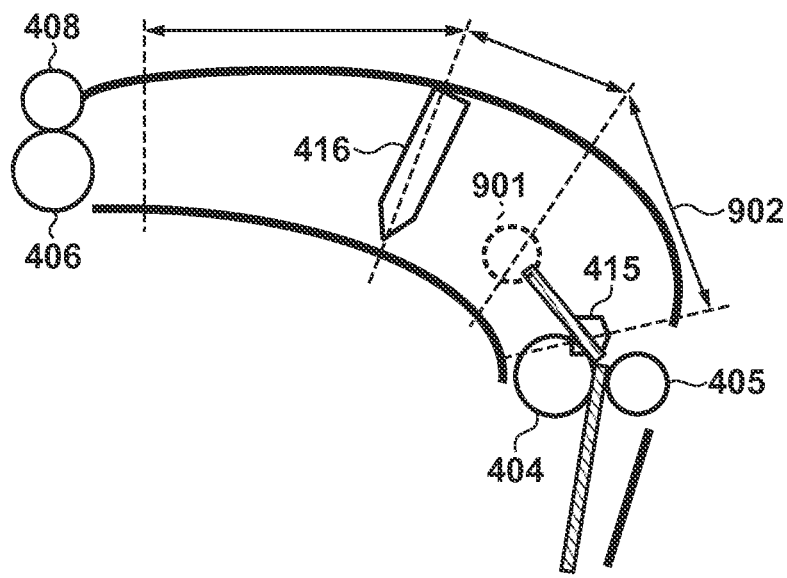
FIGS. 9A and 9B are views for explaining the conveyance operation of preceding and succeeding sheets.
Figure 9B:
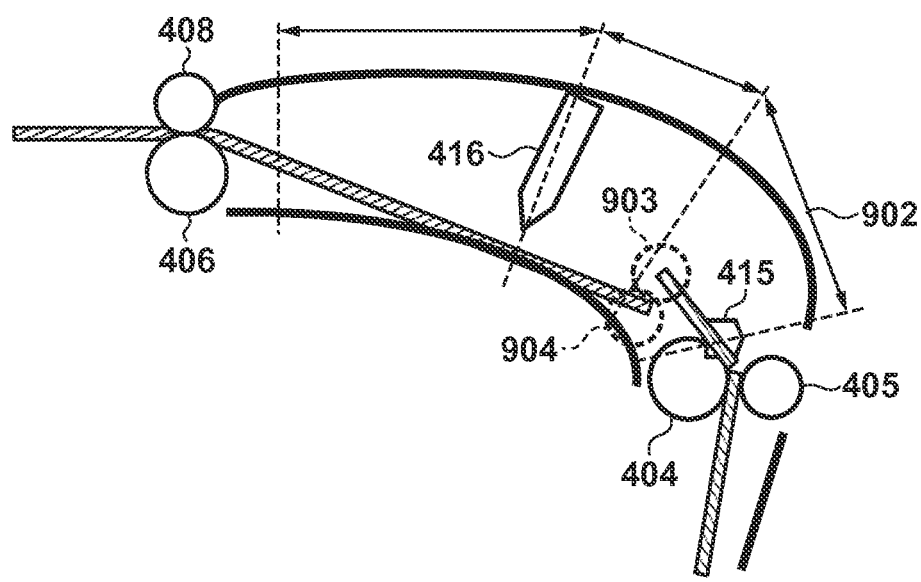

FIGS. 9A and 9B are views for explaining the conveyance operation of preceding and succeeding sheets. The operation of forming the overlapped state in which the leading end portion of a succeeding sheet overlaps the trailing end portion of a preceding sheet, which has been described in steps S812 and S813 of FIG. 8A, will be explained. FIGS. 9A and 9B are enlarged views showing a section between a feeding roller nip portion formed by the feeding roller 404 and the feeding driven roller 405, and a conveyance roller nip portion formed by the conveyance roller 406 and the pinch roller 408.

Figure 10A:
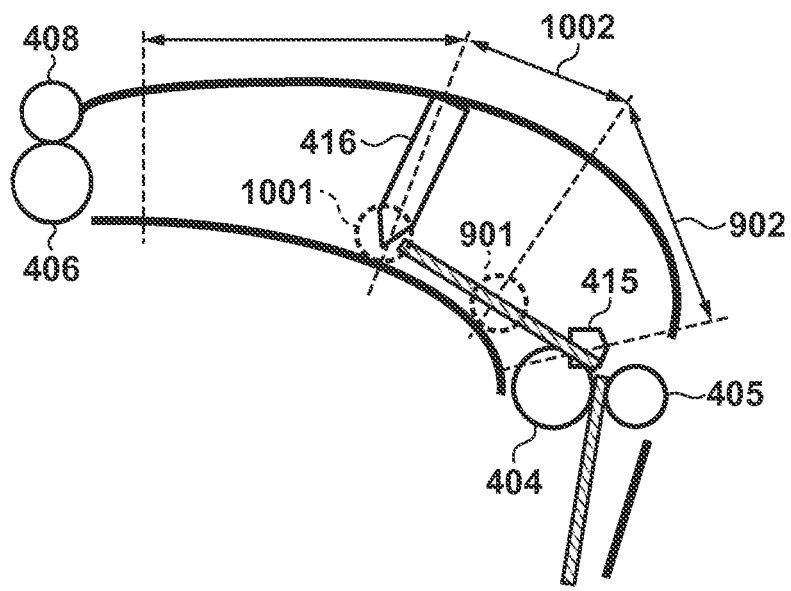
FIGS. 10A and 10B are views for explaining the conveyance operation of preceding and succeeding sheets.
Figure 10B:
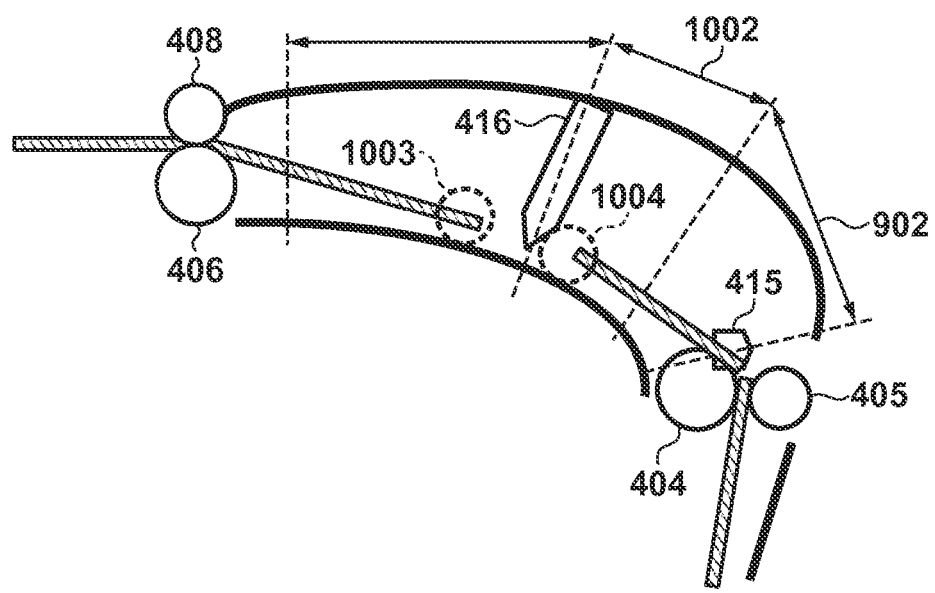
Figure 11:
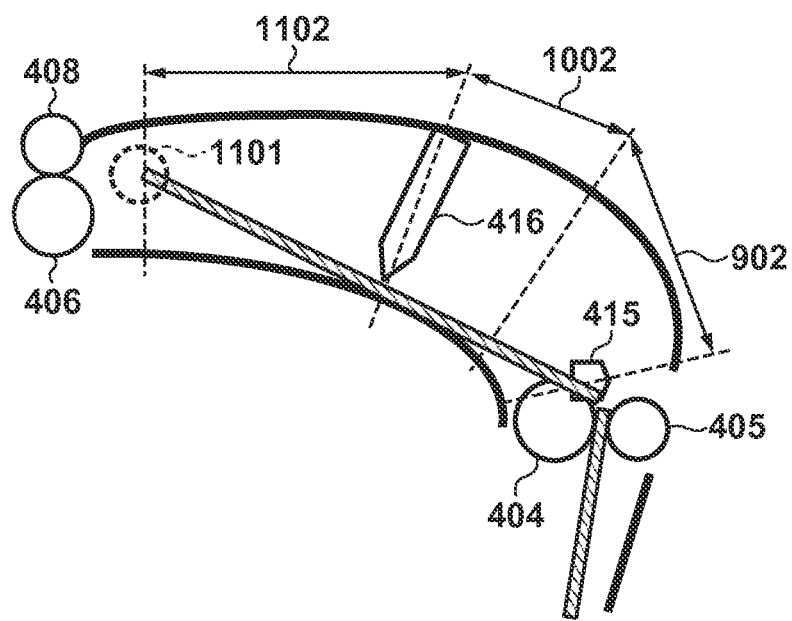
FIG. 11 is a view for explaining the conveyance operation of preceding and succeeding sheets.

The process of conveying a printing sheet by the conveyance roller 406 and the feeding roller 404 will be explained as three states in order. FIGS. 9A and 9B show the first state, that is, a section in which a succeeding sheet chases a preceding sheet. FIGS. 10A and 10B show the second state, that is, a section in which the succeeding sheet overlaps the preceding sheet. FIG. 11 shows the third state, that is, a section in which when performing abutment and skew correction, it is determined whether to stop the conveyance operation of the succeeding sheet and cancel the overlapped state or to continue the overlapped state.

In FIG. 9A, the CPU 201 controls the feeding motor driver 304 to convey the succeeding sheet, and the sheet detection sensor 415 detects the succeeding sheet. In a section 902 up to a position 901 at which the succeeding sheet can overlap the preceding sheet, the succeeding sheet chases the preceding sheet. The position 901 where the succeeding sheet can overlap the preceding sheet is determined in accordance with the conveyance arrangement. In the first state, the operation of causing the succeeding sheet to chase the preceding sheet is sometimes stopped in the section 902. In a situation in which a leading end 903 of the succeeding sheet passes a trailing end 904 of the preceding sheet, as shown in FIG. 9B, no appropriate overlapping amount or the like may be obtained, so overlapping of the preceding and succeeding sheets in the second state is not performed.

In FIG. 10A, an operation of causing the succeeding sheet to overlap the preceding sheet is performed in a section 1002 from the position 901 at which the succeeding sheet can overlap the preceding sheet, up to a position 1001 at which the sheet press lever 416 can press the printing sheet. In the second state, the operation of causing the succeeding sheet to overlap the preceding sheet is sometimes stopped in the section 1002. In a situation in which a leading end 1004 of the succeeding sheet is spaced apart from a trailing end 1003 of the preceding sheet by a predetermined interval or more and cannot catch up with it, as shown in FIG. 10B, the operation of causing the succeeding sheet to overlap the preceding sheet is not performed.

In FIG. 11, the succeeding sheet is conveyed to a section 1102 up to a position 1101 where it is determined whether to continue the overlapped state. When performing abutment and skew correction of the succeeding sheet at the position 1101, it is determined whether to continue the overlapped state in which the preceding and succeeding sheets partially overlap each other, or cancel the overlapped state.

Figure 12:
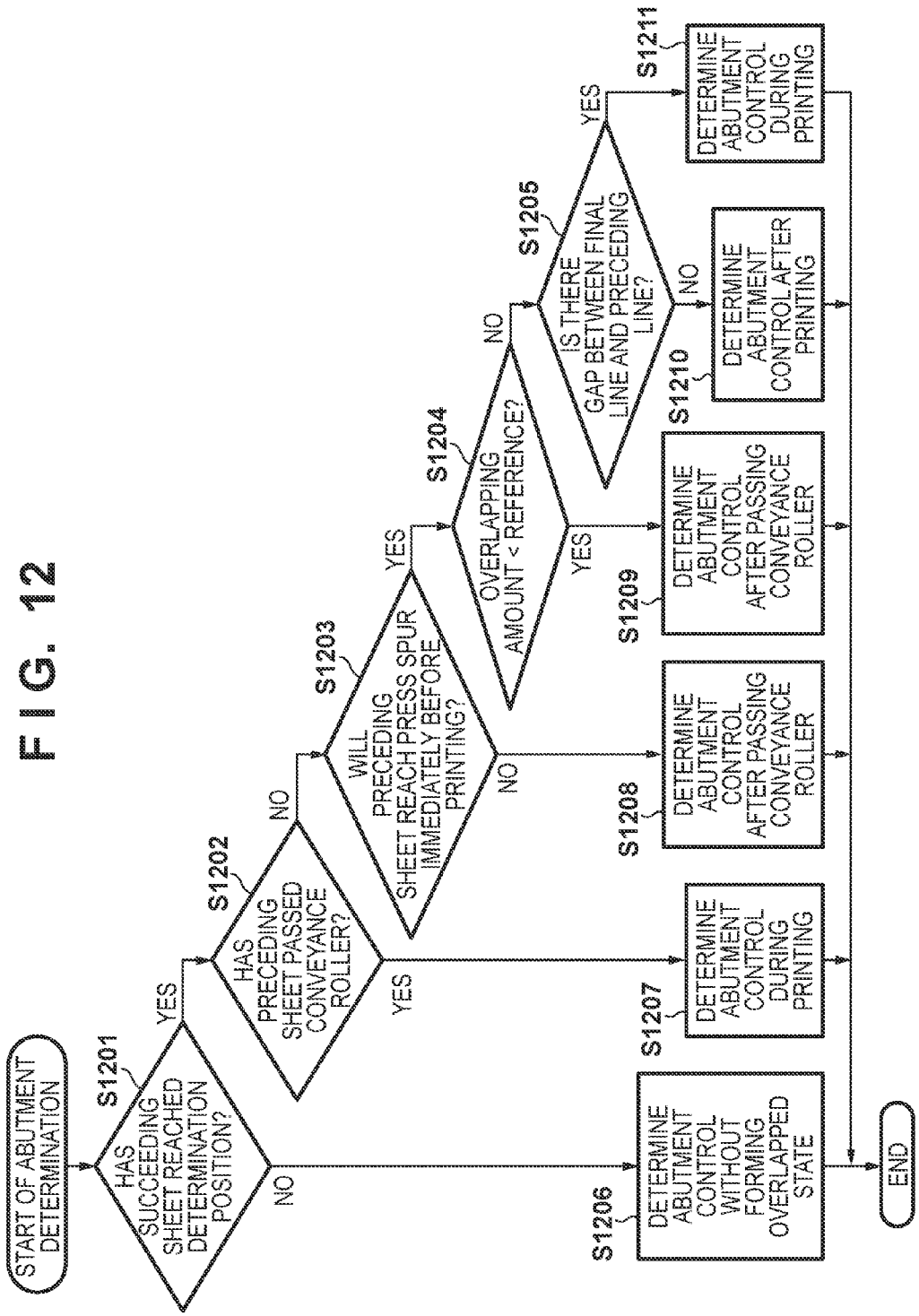
FIG. 12 is a flowchart showing determination processing when performing a skew correction operation for a succeeding sheet.

FIG. 12 is a flowchart showing determination processing when performing the skew correction operation at the time of aligning the leading end of a succeeding sheet. FIG. 12 shows determination processing of whether the predetermined condition in step S814 of FIG. 8A has been satisfied. That is, the processing in FIG. 12 represents determination processing of whether to continue the overlapped state of preceding and succeeding sheets and perform skew correction by abutment, or to cancel the overlapped state and perform skew correction by abutment.

In step S1201, the CPU 201 determines whether the succeeding sheet has reached the position 1101 in FIG. 11. If the CPU 201 determines that the succeeding sheet has not reached the position 1101, the succeeding sheet cannot overlap the preceding sheet, and the CPU 201 determines in step S1206 to perform the skew correction operation by abutment on the succeeding sheet without forming the overlapped state. If this determination is made, it advances to step S827 after step S814 of FIG. 8A. If the CPU 201 determines that the succeeding sheet has reached the position 1101, it advances to step S1202.

In step S1202, the CPU 201 determines whether the preceding sheet has passed the conveyance roller 406. If the CPU 201 determines that the preceding sheet has passed the conveyance roller 406, it determines in step S1207 to perform the skew correction operation by abutment on the succeeding sheet during printing on the preceding sheet. If this determination is made, the CPU 201 advances to step S827 after step S814 of FIG. 8A. If the CPU 201 determines that the preceding sheet has not passed the conveyance roller 406, it advances to step S1203. When the CPU 201 advances to step S1203, the preceding and succeeding sheets overlap each other.

In step S1203, the CPU 201 determines whether the preceding sheet will reach the press spur 413 immediately before printing. If the CPU 201 determines that the preceding sheet will not reach the press spur 413, it determines in step S1208 to perform the skew correction operation by abutment on the succeeding sheet after the overlapped state is canceled and the preceding sheet passes the conveyance roller 406. If this determination is made, the CPU 201 advances to step S827 after step S814 of FIG. 8A. If the CPU 201 determines that the preceding sheet will reach the press spur 413, it advances to step S1204.

In step S1204, the CPU 201 determines whether the overlapping amount between the preceding and succeeding sheets is smaller than a predetermined reference value. If the CPU 201 determines that the overlapping amount is smaller than the predetermined reference value, it determines in step S1209 to perform the skew correction operation by abutment on the succeeding sheet after the overlapped state is canceled and the preceding sheet passes the conveyance roller 406. In this case, the CPU 201 advances to step S827 after step S814 of FIG. 8A. If the CPU 201 determines that the overlapping amount is equal to or larger than the predetermined reference value, it advances to step S1205.

In step S1205, the CPU 201 determines whether a gap of a predetermined value or more exists between the final line and preceding line of the preceding sheet. If the CPU 201 determines that the gap of the predetermined value or more does not exist, it determines in step S1210 to perform the skew correction operation by abutment on the succeeding sheet after the overlapped state is canceled and printing on the preceding sheet ends. If this determination is made, the CPU 201 advances to step S827 after step S814 of FIG. 8A. If the CPU 201 determines that the of the predetermined value or more exists, it advances to step S1211.

In step S1211, the CPU 201 determines to maintain the overlapped state and perform the skew correction operation by abutment on the succeeding sheet during printing on the preceding sheet (during the stop of the conveyance operation in the intermittent conveyance operation). If this determination is made, the CPU 201 advances to step S815 after step S814 of FIG. 8A.

Figure 13:
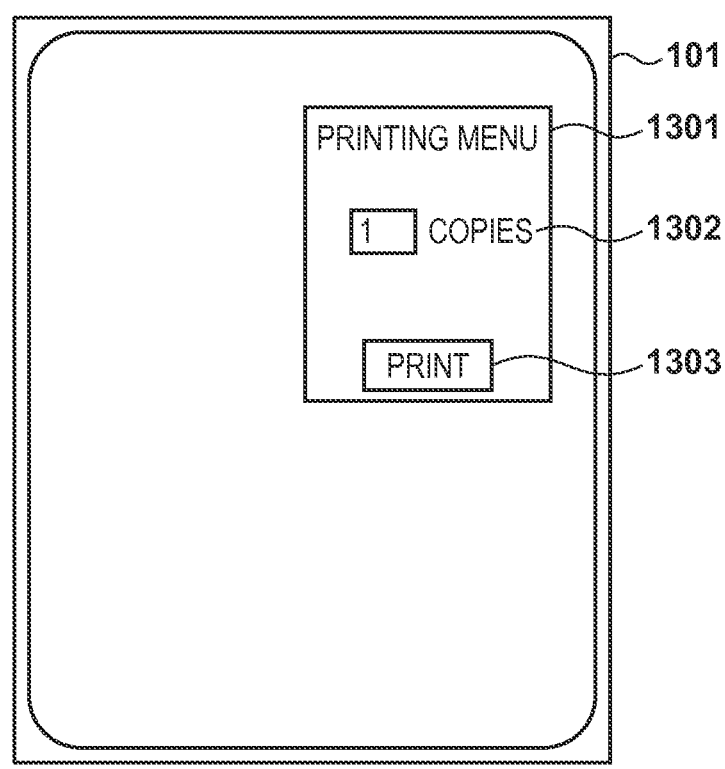
FIG. 13 is a view showing a menu screen for designating printing.

FIG. 13 is a view showing an example of a menu screen that is displayed on the tablet 101 in order to designate printing. The user can view photographs and create a text by operating an application running on the tablet 101. When the user wants to perform printing, he calls the print function from each application or further calls the application. The print function displays a printing menu screen 1301 on the display unit of the tablet 101, notifies the user of settable items, and waits for an input from the user. In this embodiment, a copy count 1302 is provided as an item inputtable by the user. FIG. 13 shows a state in which a copy count of 1 is selected in the copy count 1302. By changing the value, the user can designate a change of the copy count. When the user presses a print button 1303 upon completion of setting, printing data is transmitted to the image forming apparatus 103 in accordance with the selected designation, and printing in the image forming apparatus 103 is executed. In the printing designation on the tablet 101, it cannot be designated whether the printing order of a plurality of copies is collation.

FIG. 14A is a view showing printing data, and shows printing data of three pages as a printing document 1401. The printing document 1401 is created in, for example, the PDF format, and the user can view the printing document 1401 on the tablet 101. FIG. 14B is a view showing a printing result based on the printing document 1401, and particularly shows a printing result in the case of collation printing. In FIG. 14B, collation printing by three copies is designated for the printing document 1401. Because of collation printing, as shown in FIG. 14B, the printing result is printed in the page order of 1, 2, 3, 1, 2, 3, 1, 2, and 3. FIG. 14C is a view showing a printing result based on the printing document 1401, and particularly shows a printing result in the case of non-collation printing. FIG. 14C shows a printing result when a copy count of 3 is designated for the printing document 1401 and collation printing is not designated. Because of non-collation printing, as shown in FIG. 14C, the printing result is printed in the page order of 1, 1, 1, 2, 2, 2, 3, 3, and 3.

In some cases, the image forming apparatus 103 can save at once all pages (for example, three pages) of the printing document 1401 transmitted from the outside, and can print a plurality of copies (for example, three copies) based on the data. In other cases, the image forming apparatus 103 cannot save at once all pages of the printing document 1401 transmitted from the outside owing to the limitation of the capacity of the buffer memory. In this case, the external apparatus needs to generate all printing data of the plurality of copies and transmit them to the image forming apparatus 103 (sequential printing). When executing collation printing, the external apparatus generates printing data as shown in FIG. 14B and transmits them to the image forming apparatus 103. When executing non-collation printing, the external apparatus generates printing data as shown in FIG. 14C and transmits them to the image forming apparatus 103. In both collation designation and non-collation designation, the image forming apparatus 103 executes printing based on printing data of each page transmitted from the external apparatus.

Figure 15A:
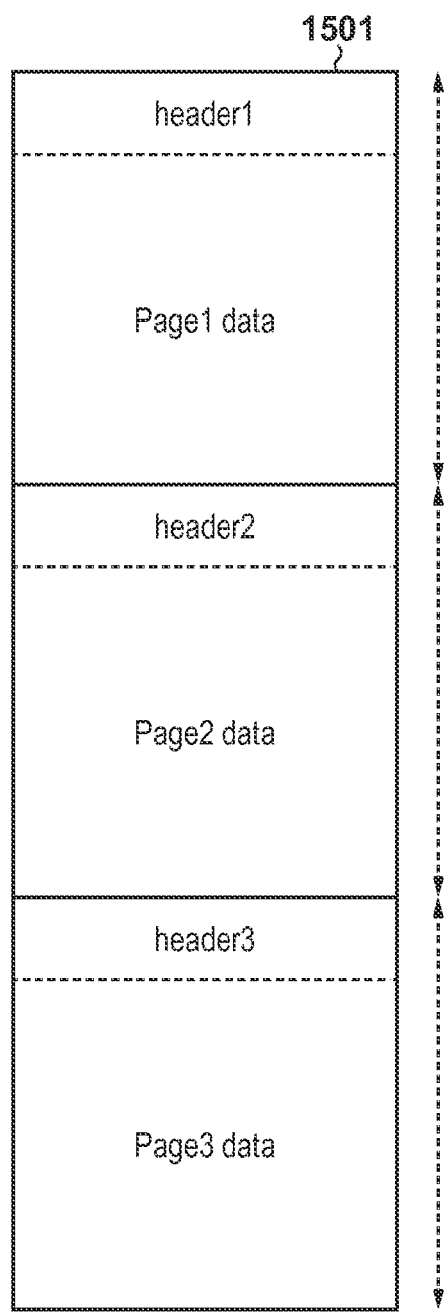
FIGS. 15A and 15B are views showing the detailed configuration of printing data.

FIG. 15A is a view showing an example of the detailed configuration of printing data including printing target data. Printing data 1501 in FIG. 15A corresponds to the printing document 1401 constituted by three pages. The printing data 1501 includes a header and page data for each page.

Figure 15B:
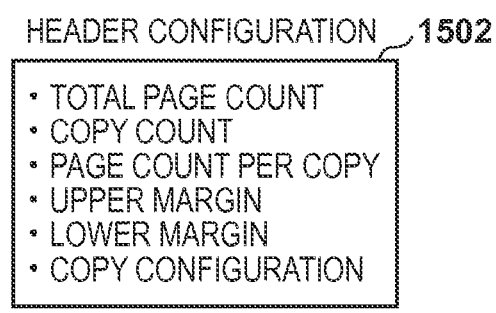

FIG. 15B is a view showing an example of header information included in the header of the printing data 1501. The header information is included in, for example, a page received first from the outside. A header 1502 includes a "total page count" indicating the number of pages constituting the printing data 1501, a "copy count" indicating the number of copies constituting the printing data 1501, and a "page count of one copy" indicating the number of pages per copy. Also, the header 1502 includes an "upper margin" indicating margin information of the upper portion of each page, a "lower margin" indicating margin information of the lower portion of each page, and a "copy configuration" indicating whether printing is collation printing.

When executing collation printing, the header 1502 is "total page count: 9, copy count: 3, page count of one copy: 3, copy configuration: collation". When not executing collation printing, the header 1502 is "total page count: 9, copy count: 3, page count of one copy: 3, copy configuration: no collation".

Figure 16A:
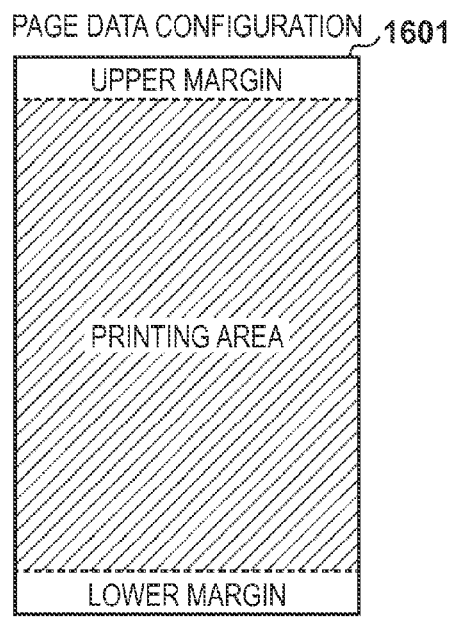
FIGS. 16A to 16C are views showing the configuration of page data.

FIG. 16A is a view showing an example of the configuration of page data. Page data 1601 includes blank data (non-printing target area), and a printing area (printing target area), and has a margin at the upper portion (upper margin) and a margin at the lower portion (lower margin) as the blank data. The upward direction in FIG. 16A is the start side in the conveyance direction. Page data is sometimes constituted without any margin. In some cases, the upper margin amount and the lower margin amount may be different in each page, and the margin amounts of each page are held in pieces of information "upper margin" and "lower margin" included in the header of each page.

Figure 16B:
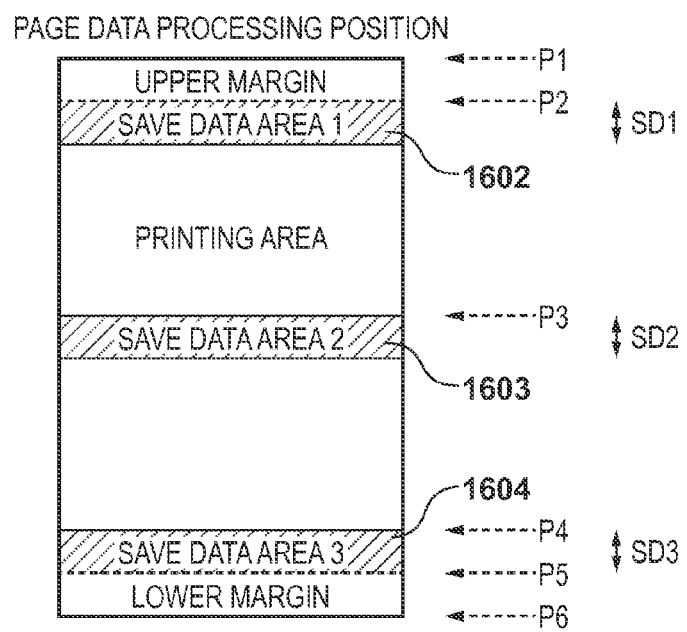

FIG. 16B is a view showing an area extracted as data for comparison between print data in the printing area. A position P1 indicates the start of page data. A position P2 indicates the start of the printing area. A position P3 indicates an intermediate position of the printing area and indicates, for example, the middle of the printing area. The middle position is determined based on printing data to undergo printing. A position P4 indicates a position before a specific position from the end of the printing area, and a position P5 indicates the start of the lower margin. A position P6 indicates the end position of the page data. In this embodiment, data of a size SD1 from the position P2 is set as a save data area 1602 (start portion) in order to compare the page data with succeeding page data and determine whether these page data are the same. Similarly, data of a size SD2 from the position P3 is set as a save data area 1603 (middle portion). Also, data of a size SD3 from the position P4 is set as a save data area 1604 (end portion).

According to this embodiment, in the case of sequential printing, the image forming apparatus 103 compares respective page data transmitted from the outside for the save data areas 1602 to 1604, and determines whether they are the same, which will be described later. Based on this determination result, the image forming apparatus 103 determines whether transmitted page data is subjected to collation printing. In some cases, the image forming apparatus 103 performs comparison between page data by using data in the engine data buffer.

Figure 16C:
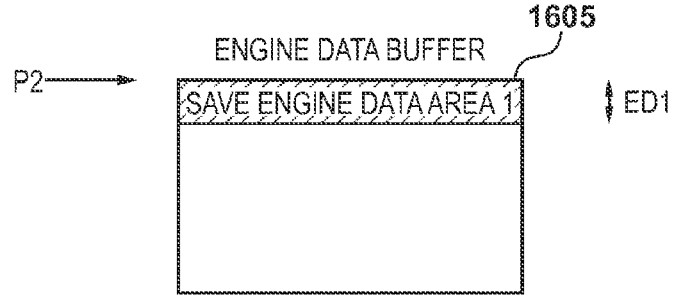
Figure 17A:
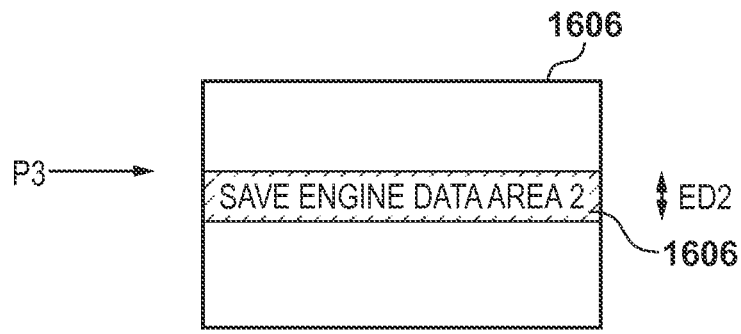
FIGS. 17A to 17C are views showing a save data area and margin table.
Figure 17B:
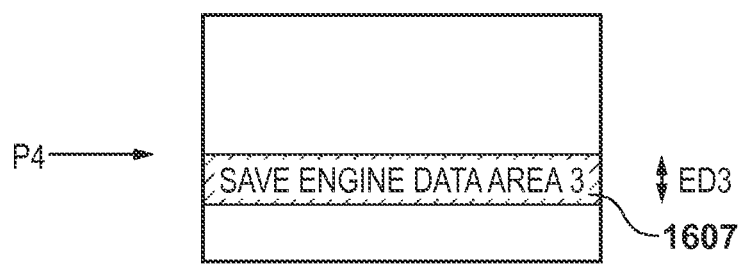

FIGS. 16C, 17A, and 17B are views showing the save area of engine data when performing comparison using data in the engine data buffer. A save engine data area 1605 in FIG. 16C corresponds to the save data area 1602, and a size ED1 corresponds to the size SD1. A save engine data area 1606 in FIG. 17A corresponds to the save data area 1603, and a size ED2 corresponds to the size SD2. A save engine data area 1607 in FIG. 17B corresponds to the save data area 1604, and a size ED3 corresponds to the size SD3.

Figure 17C:
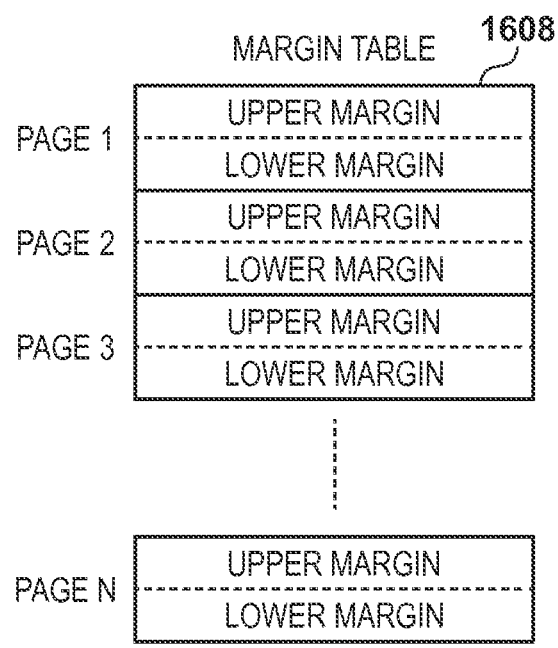

FIG. 17C is a view showing an example of a margin table 1608 in which the upper margin amount and lower margin amount of each page are saved. As shown in FIG. 17C, the upper margin amount and lower margin amount (upper and lower margin sizes) are saved for each of pages 1 to N. The upper margin amount and the lower margin amount are indicated by margin lengths, like SD1 to SD3 or ED1 to ED3 described above.

[Printing Processing]

Figure 18:
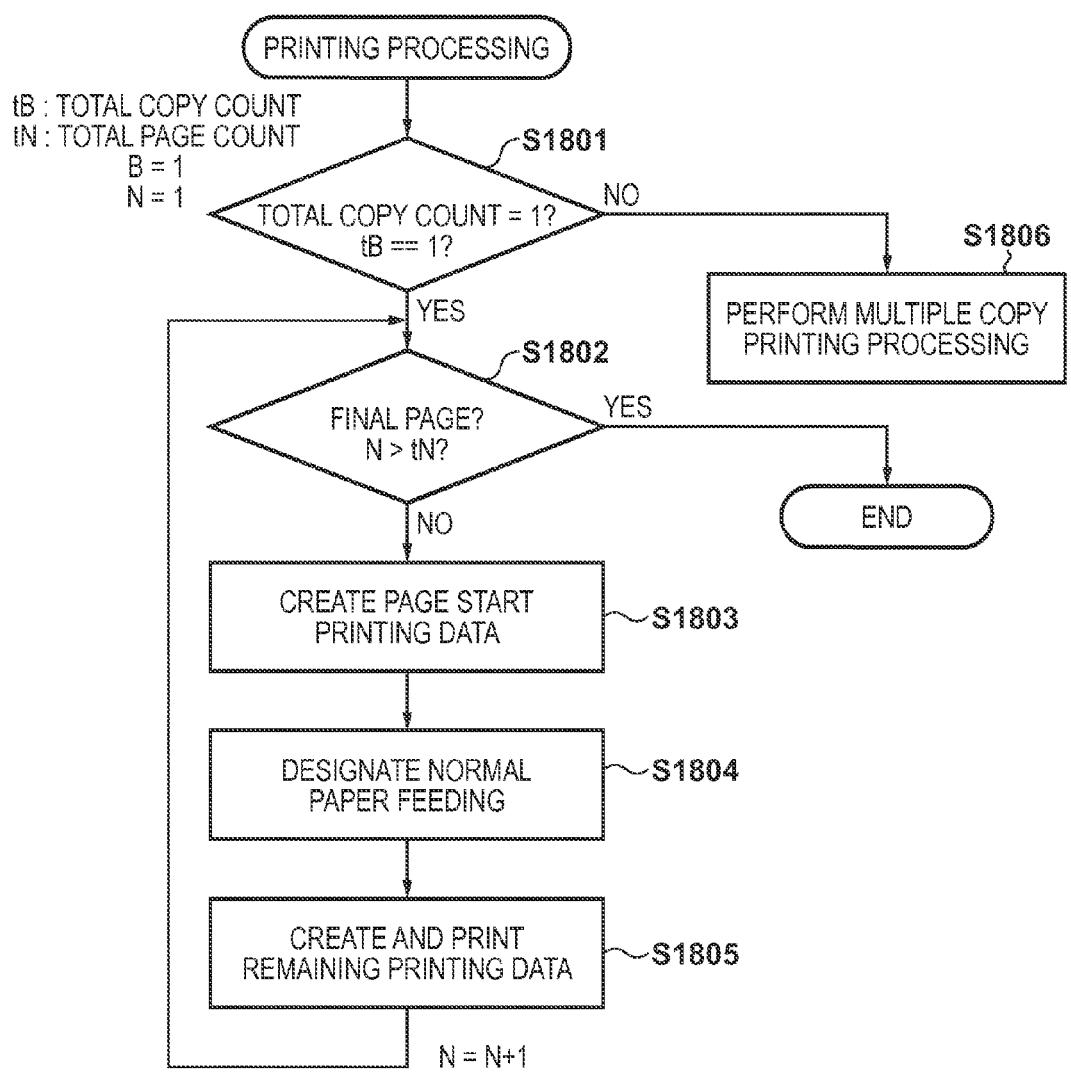
FIG. 18 is a flowchart showing the procedures of printing processing.

FIG. 18 is a flowchart showing the procedures of printing processing. The processing shown in FIG. 18 is implemented by loading a program stored in the ROM 202 and executing it by the CPU 201. First, the CPU 201 ensures variables tB, tN, B, and N in a storage area such as the RAM. Then, the CPU 201 acquires the copy count and total page count of printing data from the header of the start page of the printing data, sets the copy count of the printing data in the variable tB, and sets the total page count in the variable tN. The value of a currently processed copy is set in the variable B, and "1" is set as an initial value. The value of a currently processed page is set in the variable N, and "1" is set as an initial value.

In step S1801, the CPU 201 determines, based on the value of the variable tB, whether the copy count of the printing data is 1. If the CPU 201 determines that the copy count is 1, it advances to step S1802. If the CPU 201 determines that the copy count is not 1, it advances to step S1806.

In step S1802, the CPU 201 determines whether the current processing target page is a final page. The determination in step S1802 is performed by determining whether the variable N is larger than the variable tN. If the CPU 201 determines that the variable N is larger than the variable tN, that is, determines that the current processing target page is a final page, it ends the processing of FIG. 18. If the CPU 201 determines that the variable N is equal to or smaller than the variable tN, that is, determines that the current processing target page is not a final page, it advances to step S1803.

In step S1803, the CPU 201 controls the image processing control unit 212 to generate page start printing data. The page start printing data is, for example, data of a predetermined unit area and is saved in the engine data buffer 218.

In step S1804, normal paper feeding designation is performed to feed paper to be printed, and paper is fed. In the normal paper feeding designation, overlapped paper feeding of a succeeding sheet on a preceding sheet is not executed. In step S1805, the CPU 201 generates engine data subsequent to the engine data generated in step S1803 within the processing target page. The CPU 201 controls the engine control unit 213 to perform printing processing by the print engine 208.

After step S1805, the CPU 201 increments the variable N by one, and returns to step S1802 to repeat steps S1803 to S1805 and perform printing of one page until it is determined that the target page is a final page. If the CPU 201 determines in step S1801 to print a plurality of copies, it advances to step S1806 to perform multiple copy printing processing shown in FIG. 19.

Figure 19:
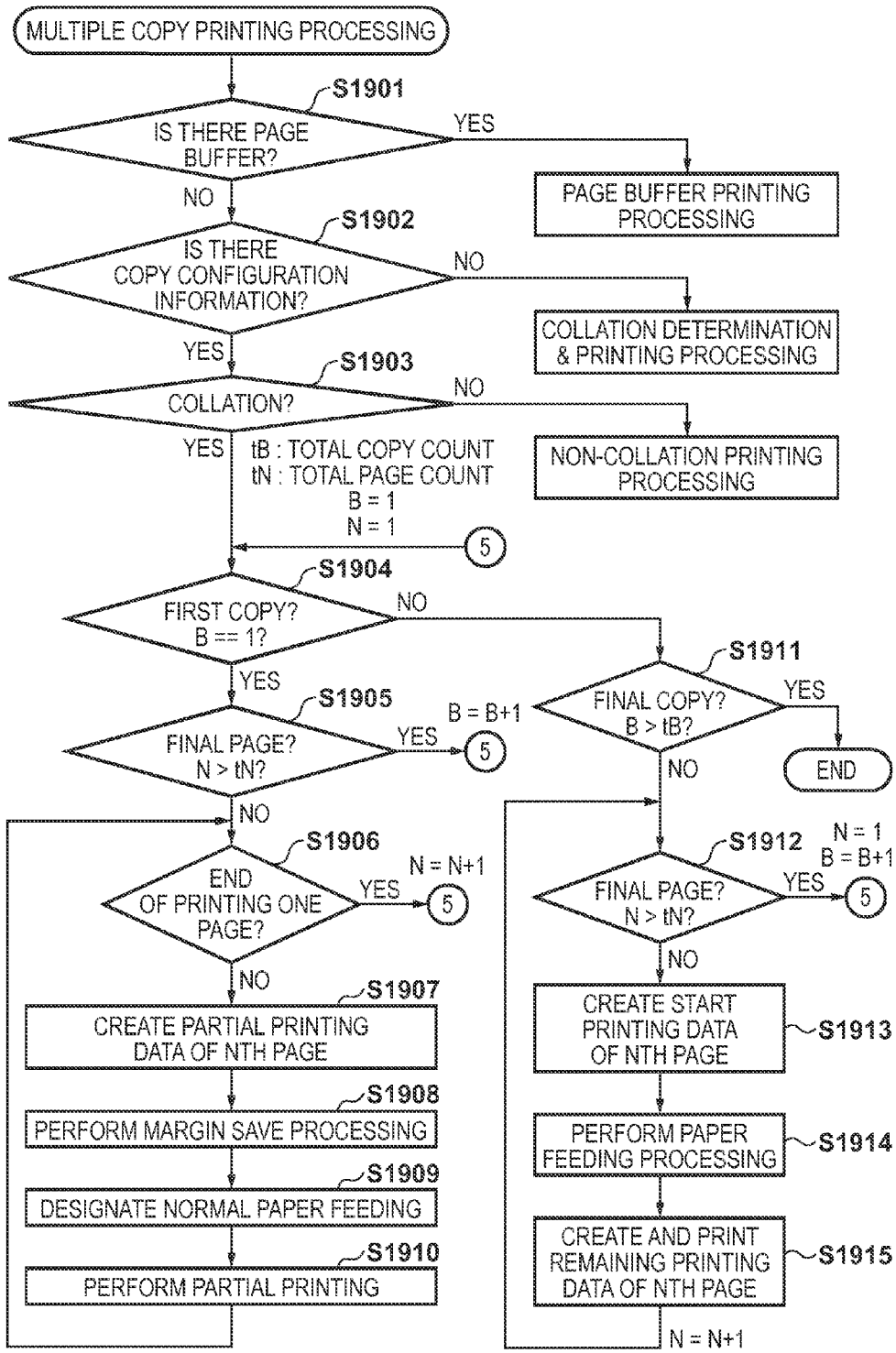
FIG. 19 is a flowchart showing multiple copy printing processing.

FIG. 19 is a flowchart showing multiple copy printing processing.

Figure 20:
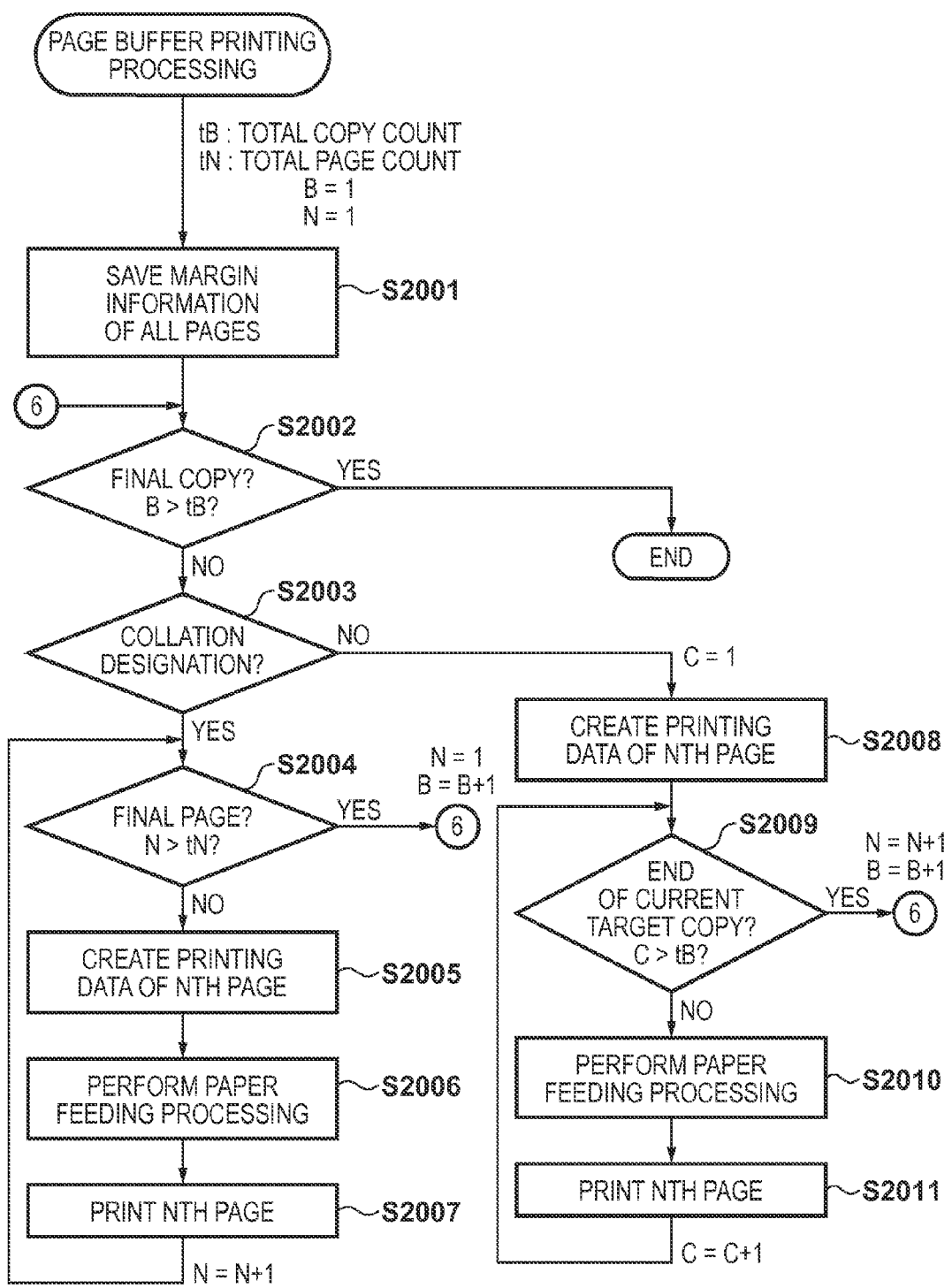
FIG. 20 is a flowchart showing printing processing when the image forming apparatus includes a page buffer.

In step S1901, the CPU 201 determines whether the image forming apparatus 103 includes a page buffer (storage unit) for one copy, and can hold all pages corresponding to one copy of a printing target. For example, the tablet 101 is notified in advance of information representing whether the image forming apparatus 103 includes the page buffer. In this case, when designating execution of printing, the tablet 101 may set, in the header, the information representing whether the image forming apparatus 103 includes the page buffer, and transmit the information together with printing data based on the notification. In this case, the CPU 201 makes the determination by acquiring, from the header of the start page, the information representing whether the image forming apparatus 103 includes the page buffer. If the CPU 201 determines that the image forming apparatus 103 includes the page buffer, page buffer printing processing shown in FIG. 20 is performed. If the CPU 201 determines that the image forming apparatus 103 does not include the page buffer, it advances to step S1902.

Figure 21:
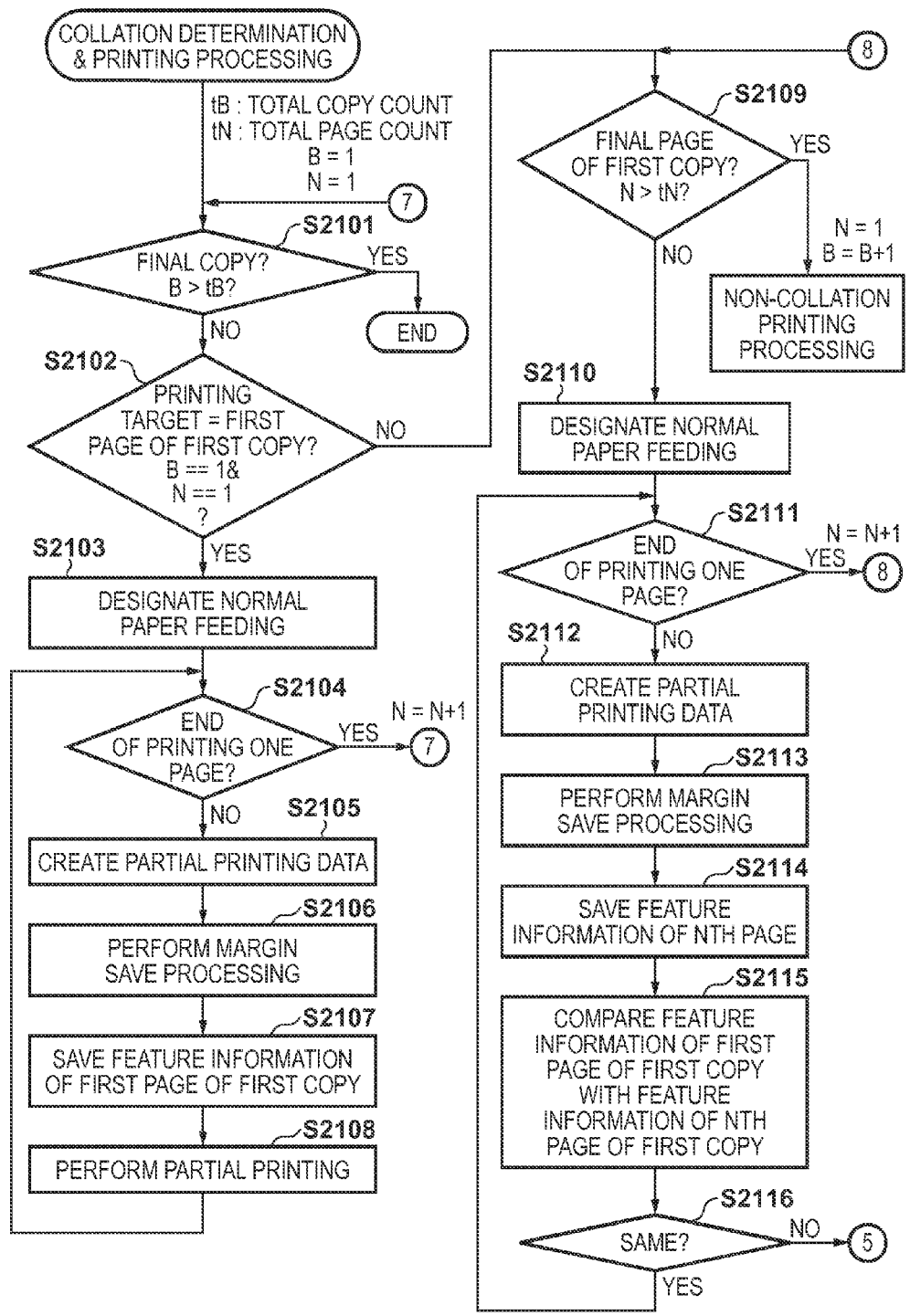
FIG. 21 is a flowchart showing the procedures of printing determination and printing processing.

In step S1902, the CPU 201 determines whether information representing the "copy configuration" exists in the header of the start page of the printing data. In some cases, the "copy configuration" information may not be set in the header depending on the processing configuration of an external device such as the tablet 101. Therefore, the determination in step S1902 is performed in this embodiment. If the CPU 201 determines that information representing the "copy configuration" does not exist, collation determination and printing processing shown in FIG. 21 are performed. If the CPU 201 determines that information representing the "copy configuration" exists, it advances to step S1903.

Figure 22:
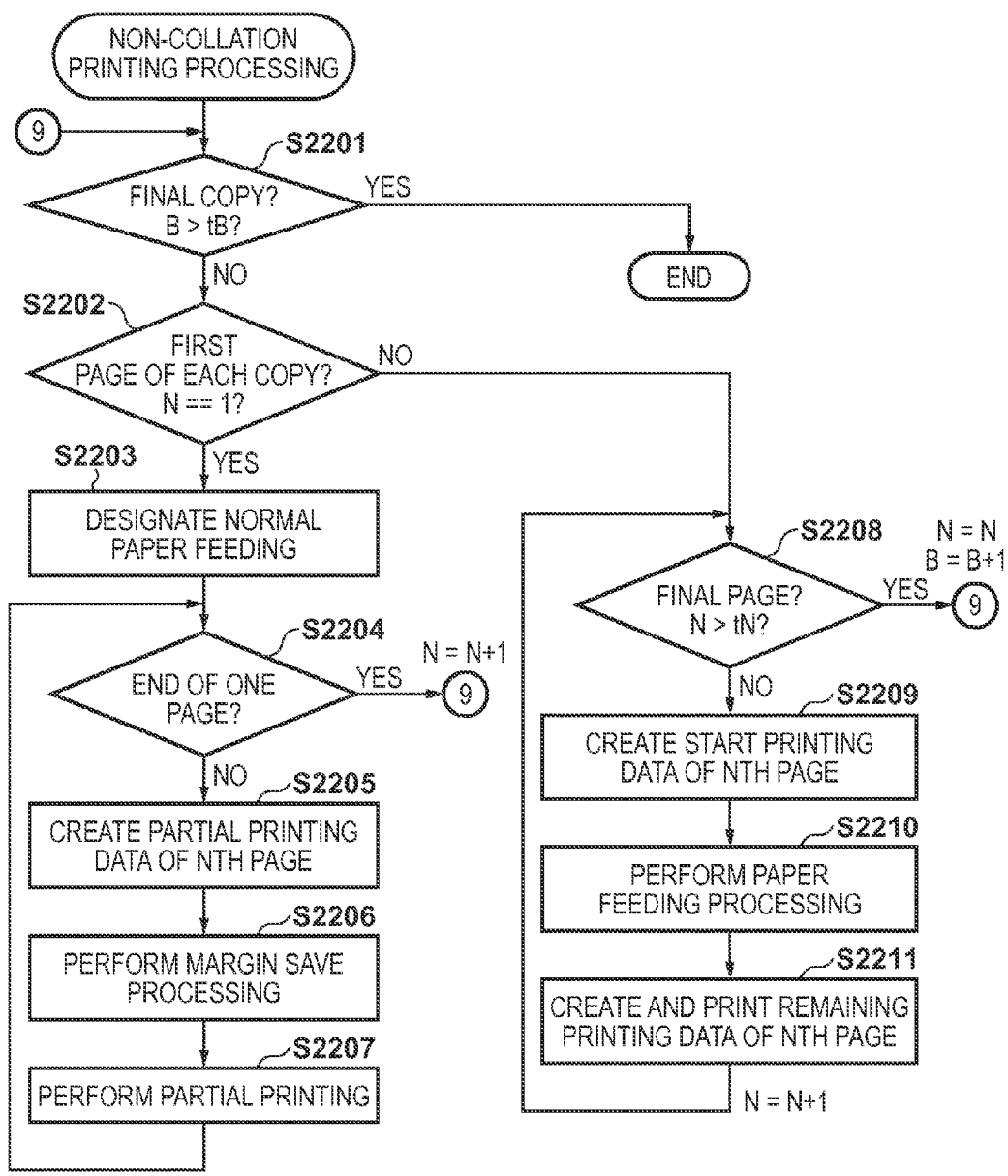
FIG. 22 is a flowchart showing the procedures of non-collation printing processing.

In step S1903, the CPU 201 determines, based on the information representing the "copy configuration" in the header of the start page of the printing data, whether printing is collation printing. If the CPU 201 determines that printing is not collation printing, non-collation printing processing shown in FIG. 22 is performed. If the CPU 201 determines that printing is collation printing, it advances to step S1904.

In step S1904, the CPU 201 determines, based on the variable B, whether the first copy is the current processing target. If the CPU 201 determines that the first copy is the current processing target, it advances to step S1905. If the CPU 201 determines that the first copy is not the current processing target, it advances to step S1911.

In step S1905, the CPU 201 determines whether the current processing target page is a final page. The determination inn step S1905 is made by determining whether the variable N is larger than the variable tN. If the CPU 201 determines that the variable N is larger than the variable tN, that is, determines that the current processing target page is a final page, it increments the variable B by one and returns to step S1904. If the CPU 201 determines that the variable N is equal to or smaller than the variable tN, that is, determines that the current processing target page is not a final page, it advances to step S1906.

In step S1906, the CPU 201 determines whether printing of one page serving as the current processing target has ended. If the CPU 201 determines that printing of one page has ended, it increments the variable N by one and returns to step S1904. If the CPU 201 determines that printing of one page has not ended, it advances to step S1907.

In step S1907, the CPU 201 generates partial printing data equivalent to part of the current processing target page, and saves it in the engine data buffer 218 (image processing). The partial printing data may be, for example, data of each predetermined line in the page. In step S1908, the CPU 201 performs margin amount save processing shown in FIG. 23 based on the printing area. The margin amount save processing is processing of determining, based on the progress of image processing, which of a leading end margin position and a trailing end margin position is the current image processing position, and when the current image processing position is each margin position, saving each margin amount. By margin save processing, the upper margin amount and lower margin amount of each page are saved, as represented by the margin table in FIG. 17C. In this embodiment, a margin amount saved when printing of the first copy was performed is used in paper feeding processing of the second and subsequent copies, and high-speed paper feeding can be implemented.

In step S1909, the CPU 201 performs normal paper feeding designation by a predetermined unit in order to feed paper to be printed (printing sheet), and feeds a printing sheet. In step S1910, the CPU 201 performs printing processing, on the fed printing sheet, of the engine data that has undergone image processing and has been saved in the engine data buffer 218, and then returns to step S1906. If the CPU 201 determines in step S1906 that printing of one page has not ended, it generates partial printing data of the next unit in step S1907. By repeating the processes in steps S1907 to S1910 by the number of pages corresponding to the first copy, printing is performed by the number of pages of the first copy, and the margin amounts are saved.

If the CPU 201 determines, based on the variable B in step S1904, that the first copy is not the current processing target, it advances to step S1911. In step S1911, the CPU 201 determines, based on whether the variable B is larger than the variable tB, whether the final copy is the current processing target. If the CPU 201 determines that the final copy is the current processing target, it ends the processing of FIG. 19. If the CPU 201 determines that the final copy is not the current processing target, it advances to S1912.

In step S1912, the CPU 201 determines, based on whether the variable N is larger than the variable tN, whether the current processing target page is a final page. If the CPU 201 determines that the current processing target page is a final page, it resets the variable N to 1, increments the variable B by one, and returns to step S1904. If the CPU 201 determines that the current processing target page is not a final page, it advances to step S1913.

In step S1913, as in step S1907, the CPU 201 generates partial printing data equivalent to part of the current processing target page. In step S1914, the CPU 201 performs designation of paper feeding processing shown in FIG. 24 in order to designate the paper feeding method of paper to be printed, and designates the paper feeding method of a printing sheet for the current processing target page. In the designation of paper feeding processing, the CPU 201 refers to whether the margin amounts of the page are set in the margin table of FIG. 17C, and compares set upper and lower margin amounts with a threshold to determine whether these margin amounts are values enough for overlapped paper feeding designation on a preceding sheet. If the margin amounts are equal to or larger than the threshold, the CPU 201 determines to perform overlapped paper feeding, and performs overlapped paper feeding as described with reference to FIG. 5C. If margin amounts are smaller than the threshold, the CPU 201 determines to perform normal paper feeding, and performs normal paper feeding. In addition to the threshold determination in the designation of paper feeding processing, each condition in FIG. 12 may be considered.

In step S1915, the CPU 201 generates engine data subsequent to the engine data generated in step S1913 within the processing target page, performs printing processing on the fed printing sheet, and ends printing of the current processing target page. The CPU 201 increments the variable N by one and returns to step S1912. By repeating steps S1912 to S1915, printing of all pages (for example, first to third pages) of the current processing target copy is performed.

As described above, when printing a plurality of copies by collation printing, overlapped paper feeding designation on a preceding sheet can be performed for the second and subsequent copies based on margin information saved for the first copy. As a result, improvement of the printing efficiency by shortening the paper feeding time can be implemented.

FIG. 20 is a flowchart showing the procedures of printing processing performed when the image forming apparatus 103 includes the page buffer. For example, an image forming apparatus including an external storage device such as a hard disk can save all page data of one copy transmitted from the outside. The image forming apparatus can then print the saved page data by a plurality of copies. If collation is designated at the time of printing a plurality of copies, the saved data can be printed in the page order of, for example, 1, 2, 3, 1, 2, 3, 1, 2, and 3. If collation is not designated, the saved data can be printed in the page order of, for example, 1, 1, 1, 2, 2, 2, 3, 3, and 3.

In step S2001, the CPU 201 analyzes printing data that has been received from the tablet 101 and saved, as described in step S1908, and stores pieces of upper/lower margin information of all pages in the margin table of FIG. 17C. The stored upper/lower margin information is used in paper feeding processing (to be described later).

In step S2002, the CPU 201 determines, based on whether the variable B is larger than the variable tB, whether the final copy is the current processing target. If the CPU 201 determines that the final copy is the current processing target, it ends the processing of FIG. 20. If the CPU 201 determines that the final copy is not the current processing target, it advances to S2003.

In step S2003, the CPU 201 determines, based on information representing the "copy configuration" in the header of the start page of the printing data, whether printing is collation printing. If the CPU 201 determines that printing is not collation printing, it advances to S2008. If the CPU 201 determines that printing is collation printing, it advances to step S2004.

In step S2004, the CPU 201 determines, based on whether the variable N is larger than the variable tN, whether the current processing target page is a final page. If the CPU 201 determines that the variable N is larger than the variable tN, that is, determines that the current processing target page is a final page, it resets the variable N to 1, increments the variable B by one, and returns to step S2002. If the CPU 201 determines that the variable N is equal to or smaller than the variable tN, that is, determines that the current processing target page is not a final page, it advances to step S2005.

In step S2005, the CPU 201 creates printing data of the current processing target page, and saves it in the engine data buffer 218. In step S2006, the CPU 201 performs designation of paper feeding processing shown in FIG. 24. As in step S1914, in the designation of paper feeding processing, the CPU 201 refers to whether the margin amounts of the page are set in the margin table of FIG. 17C. Then, the CPU 201 designates either normal paper feeding or overlapped paper feeding on a preceding sheet in accordance with whether set upper and lower margin amounts are values enough for overlapped paper feeding designation on a preceding sheet.

In step S2007, the CPU 201 prints the current processing target page by the designated paper feeding processing. After that, the CPU 201 increments the variable N by one and returns to step S2004. By repeating steps S2004 to S2007, printing of all pages (for example, first to third pages) of the current processing target copy is performed. After the end of the processing by the total copy count, the printing result is a collation printing result in the page order of, for example, 1, 2, 3, 1, 2, 3, 1, 2, and 3.

If the CPU 201 determines in step S2003 that printing is not collation printing, it ensures a variable C in a storage area such as the RAM, sets "1" as an initial value, and advances to step S2008. In step S2008, the CPU 201 generates printing data of the Nth page (N=1 at present), and saves it in the engine data buffer 218.

In step S2009, the CPU 201 determines, based on whether the variable C is larger than the variable tB, whether printing of the current processing target copy has ended. If the CPU 201 determines that the variable C is larger than the variable tB, that is, determines that printing of the current processing target copy has ended (for example, the first page has been printed by three sheets), it increments the variable N by one, increments the succeeding sheet B by one, and returns to step S2002. If the CPU 201 determines that the variable C is equal to or smaller than the variable tB, that is, determines that printing of the current processing target copy has not ended, it advances to step S2010.

Figure 24:
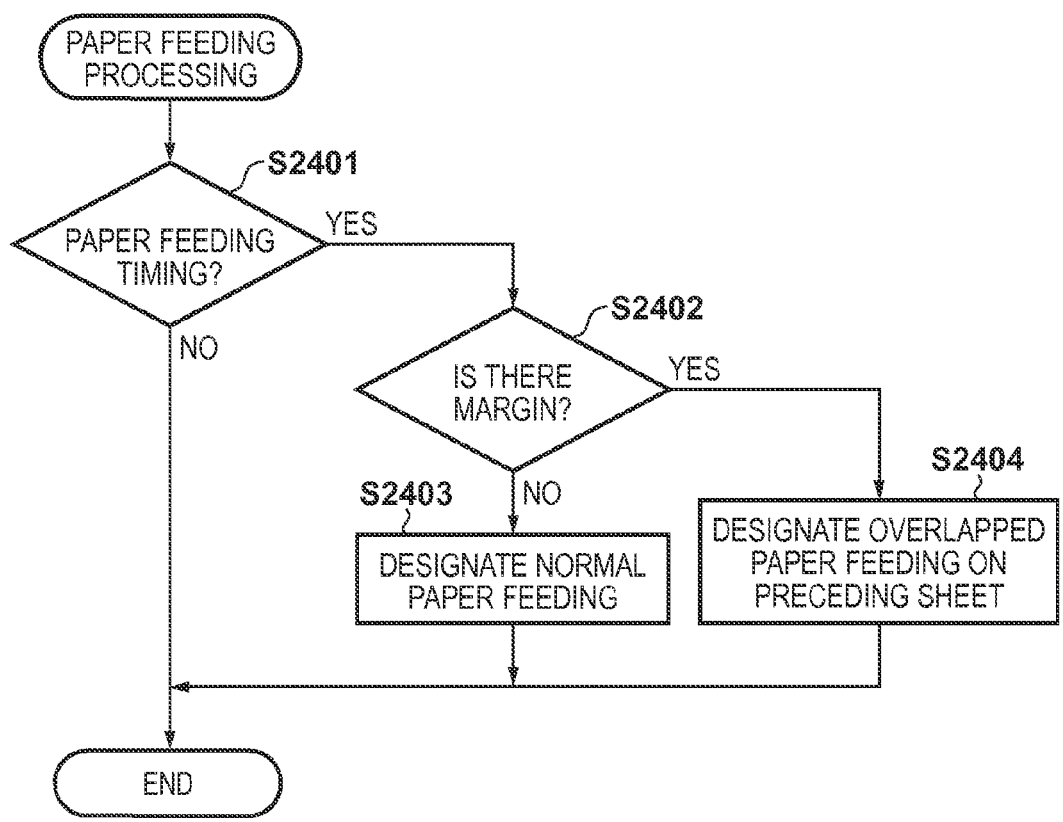
FIG. 24 is a flowchart showing the procedures of paper feeding control processing.

In step S2010, the CPU 201 performs designation of paper feeding processing shown in FIG. 24. In step S2011, the CPU 201 performs printing of the Nth page (N=1 at present) based on the engine data saved in the engine data buffer 218. At this time, paper feeding is performed by paper feeding processing designated in step S2010. Then, the CPU 201 increments the variable C by one and returns to step S2009.

By repeating steps S2009 to S2011, printing of the current processing target copy (for example, printing of the first page by three sheets) is performed. After the end of the processing by the total copy count, the printing result is a printing result in the page order of, for example, 1, 1, 1, 2, 2, 2, 3, 3, and 3.

FIG. 21 is a flowchart showing the procedures of printing determination of whether to perform collation, and printing processing. The processing in FIG. 21 is executed when whether collation printing is designated for printing data cannot be determined from information included in the header of the printing data. In the processing of FIG. 21, the data configuration of printing data is determined at the time of printing the first copy, and it is determined whether to perform collation printing of the printing data. Printing of subsequent copies is also performed in accordance with the determination result.

In step S2101, the CPU 201 determines, based on whether the variable B is larger than the variable tB, whether the final copy is the current processing target. If the CPU 201 determines that the final copy is the current processing target, it ends the processing of FIG. 21. If the CPU 201 determines that the final copy is not the current processing target, it advances to S2102.

In step S2102, the CPU 201 determines, based on the variables B and N, whether the current processing target page is the first page of the first copy. If the CPU 201 determines that the current processing target page is the first page of the first copy, it advances to step S2103. If the CPU 201 determines that the current processing target page is not the first page of the first copy, it advances to step S2109. In step S2103, the CPU 201 designates normal paper feeding as the paper feeding method of a printing sheet to be printed.

In step S2104, the CPU 201 determines whether printing of one page serving as the current processing target has ended. If the CPU 201 determines that printing of one page has ended, it increments the variable N by one and returns to step S2101. If the CPU 201 determines that printing of one page has not ended, it advances to step S2105.

In step S2105, the CPU 201 generates partial printing data equivalent to part of the current processing target page, and saves it in the engine data buffer 218 (image processing). Note that printing data transmitted from the tablet 101 is ensured in another storage area for the purpose of processing in step S2107. The partial printing data may be, for example, data of each predetermined line in the page. In step S2106, the CPU 201 performs margin amount save processing shown in FIG. 23 based on the printing area.

In step S2107, the CPU 201 acquires and saves pieces of feature information of predetermined portions of the first page of the first copy. Saving of the feature information is processing of extracting and saving reference data for determining whether printing processing of the next page is printing processing of a page with the same contents as those of a preceding page. The predetermined portions to be saved in step S2107 are the save data areas 1602 to 1604 each serving as part of the printing data transmitted from the tablet 101 shown in FIG. 16B.

When saving the save data area 1602 in step S2107, the CPU 201 saves even the position P2 and the size SD1 together. When saving the save data area 1603, the CPU 201 saves even the position P3 and the size SD2 together. When saving the save data area 1604, the CPU 201 saves even the position P4 and the size SD3 together. In this embodiment, the three save data areas 1602 to 1604 are saved, but the number of areas is not particularly limited. In this embodiment, three, top, middle, and bottom portions of the printing area are save targets, but even the target portions are not particularly limited.

In step S2108, the CPU 201 performs printing processing based on the engine data saved in the engine data buffer 218 (partial printing). The CPU 201 then returns to step S2104. By repeating steps S2105 to S2108, printing of one page is performed.

After the end of printing the first page of the first copy, the CPU 201 increments the variable N by one in step S2104 and advances to step S2101. In this case, the CPU 201 determines in step S2102 that the current processing target page is not the first page of the first copy, and advances to step S2109.

In step S2109, the CPU 201 determines, based on whether the variable N is larger than the variable tN, whether the current page is a final page in the current processing target copy. If the CPU 201 determines that the current page is a final page, this means that printing data of the first copy have the same contents, and non-collation printing processing shown in FIG. 22 is executed. If the CPU 201 determines that the current page is not a final page, it advances to step S2110. In step S2110, the CPU 201 designates normal paper feeding as the paper feeding method of a printing sheet to be printed.

In step S2111, the CPU 201 determines whether printing of one page serving as the current processing target has ended. If the CPU 201 determines that printing of one page has ended, it increments the variable N by one and returns to step S2109. If the CPU 201 determines that printing of one page has not ended, it advances to step S2112.

In step S2112, the CPU 201 generates partial printing data equivalent to part of the current processing target page, and saves it in the engine data buffer 218 (image processing). Note that printing data transmitted from the tablet 101 is ensured in another storage area for the purpose of processing in step S2114. The partial printing data may be, for example, data of each predetermined line in the page. In step S2113, the CPU 201 performs margin amount save processing shown in FIG. 23 based on the printing area.

In step S2114, the CPU 201 acquires and saves feature information of the current processing target page. The save targets in step S2114 are the save data areas 1602 to 1604 each serving as part of the printing data transmitted from the tablet 101 shown in FIG. 16B.

In step S2115, the CPU 201 compares feature information of the first page of the first copy saved in step S2107 with feature information of the Nth page saved in step S2114 (example of page determination). If the CPU 201 determines in step S2116 as a result of the comparison in step S2115 that the printing contents are the same, it returns to step S2111. If the CPU 201 determines that the printing contents are different, it determines that the printing data has the collation configuration, and advances to step S1904 of FIG. 19 to perform collation printing processing. That is, when steps S2112 to S2116 are repeated by, for example, three times and it is determined in step S2109 that the current page is a final page, this means non-collation printing of printing the first page by three sheets.

As described above, according to this embodiment, whether printing data transmitted from the tablet 101 has the collation printing configuration is determined based on printing data of the first copy.

FIG. 22 is a flowchart showing the procedures of non-collation printing processing. The processing in FIG. 22 is executed when printing data does not designate collation.

In step S2201, the CPU 201 determines, based on whether the variable B is larger than the variable tB, whether the final copy is the current processing target. If the CPU 201 determines that the final copy is the current processing target, it ends the processing of FIG. 22. If the CPU 201 determines that the final copy is not the current processing target, it advances to S2202.

In step S2202, the CPU 201 determines whether the target page is the first page of the current processing target copy. If the CPU 201 determines that the target page is the first page, it advances to step S2203. If the CPU 201 determines that the target page is not the first page, it advances to step S2208.

In step S2203, the CPU 201 designates normal paper feeding as the paper feeding method of paper to be printed. In step S2204, the CPU 201 determines whether printing of one page serving as the current processing target has ended. If the CPU 201 determines that printing of one page has ended, it increments the variable N by one and returns to step S2201. If the CPU 201 determines that printing of one page has not ended, it advances to step S2205.

In step S2205, the CPU 201 generates partial printing data equivalent to part of the current processing target page, and saves it in the engine data buffer 218 (image processing). The partial printing data may be, for example, data of each predetermined line in the page. In step S2206, the CPU 201 performs margin amount save processing shown in FIG. 23 based on the printing area.

In step S2207, the CPU 201 performs printing processing, on the fed printing sheet, of the engine data that has undergone image processing and has been saved in the engine data buffer 218, and then returns to step S2204. By repeating the processes in steps S2205 to S2207, printing of the current processing target page is performed.

If the CPU 201 determines in step S2202 that the target page is not the first page of the current processing target copy, it advances to step S2208. In step S2208, the CPU 201 determines, based on whether the variable N is larger than the variable tN, whether the target page is the final page of the current processing target copy. If the CPU 201 determines that the target page is the final page, it resets the variable N to 1, increments the variable B by one, and returns to step S2201. If the CPU 201 determines that the target page is not the final page, it advances to step S2209.

In step S2209, the CPU 201 generates partial printing data equivalent to part of the current processing target page. In step S2210, the CPU 201 performs designation of paper feeding processing shown in FIG. 24 in order to designate the paper feeding method of paper to be printed, and designates the paper feeding method of a printing sheet for the current processing target page.

In step S2211, the CPU 201 generates engine data subsequent to the engine data generated in step S2209 within the processing target page, performs printing processing on the fed printing sheet, and ends printing of the current processing target page. The CPU 201 increments the variable N by one and returns to step S2208. By repeating steps S2209 to S2211, printing of all pages (for example, printing of the first page by three sheets) of the current processing target copy is performed.

Figure 23:
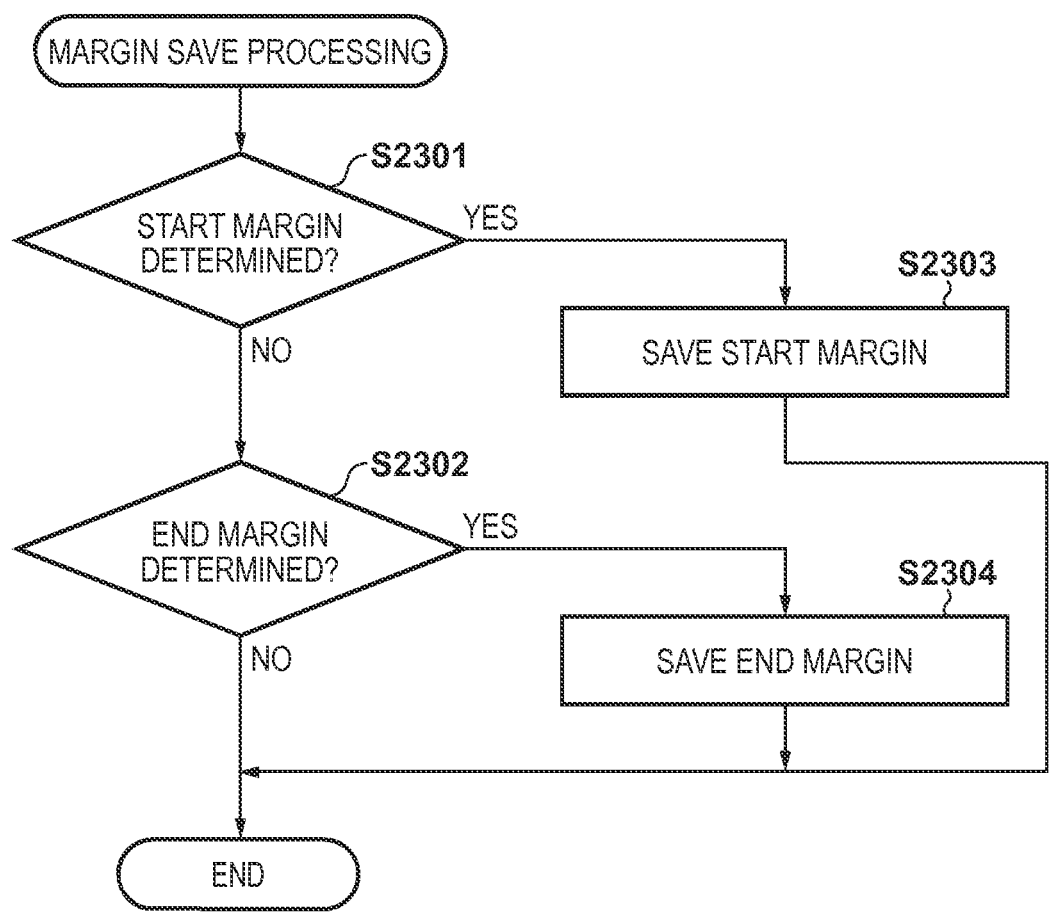
FIG. 23 is a flowchart showing the procedures of margin save processing.

FIG. 23 is a flowchart showing the procedures of margin save processing. The processing in FIG. 23 is called during each of the above-described flowcharts when it becomes necessary to save a margin, and proper upper and lower margin amounts are saved along with the progress of image processing.

In step S2301, the CPU 201 detects a margin portion having no printing target image during image analysis from the start of page data, and determines whether there is a start margin area detected by the printing area. The margin area is indicated by the number of lines, the number of pixels, or the like. If the CPU 201 determines that there is a start margin area, it advances to step S2303. If the CPU 201 determines that there is no start margin area, it advances to step S2302. In step S2303, the CPU 201 stores the margin amount of the start margin area in the margin table of FIG. 17C, and ends the processing of FIG. 23.

In step S2302, the CPU 201 detects a margin portion having no printing target image during image analysis subsequently to the printing area, and determines whether there is an end margin area detected by the end of page data. If the CPU 201 determines that there is an end margin area, it advances to step S2304. If the CPU 201 determines that there is no end margin area, it ends the processing of FIG. 23. In step S2304, the CPU 201 stores the margin amount of the end margin area in the margin table of FIG. 17C, and ends the processing of FIG. 23.

FIG. 24 is a flowchart showing the procedures of designation of paper feeding processing. In the processing shown in FIG. 24, whether to perform overlapped paper feeding of causing a succeeding sheet to partially overlap a preceding sheet, or perform normal paper feeding without causing preceding and succeeding sheets to overlap each other is designated in paper feeding processing of a printing sheet.

In step S2401, the CPU 201 determines whether the timing to execute paper feeding has come. If the CPU 201 determines that the timing to execute paper feeding has not come, it ends the processing of FIG. 24. If the CPU 201 determines that the timing to execute paper feeding has come, the process advances to step S2402.

In step S2402, the CPU 201 determines whether a margin amount of a size equal to or larger than a threshold has been stored for the target page in the margin table of FIG. 17C (example of margin determination). If the CPU 201 determines that a margin amount of a size equal to or larger than the threshold has not been stored, it designates normal paper feeding as the paper feeding method in step S2403, and then ends the processing of FIG. 24. If the CPU 201 determines that a margin amount of a size equal to or larger than the threshold has been stored, it designates overlapped paper feeding on a preceding sheet as the paper feeding method in step S2404, and then ends the processing of FIG. 24.

In this embodiment, printing data transmitted from the tablet 101 are saved for a plurality of areas as data used to determine a difference between pieces of feature information of pages in FIG. 21, and these printing data are compared. However, not printing data from the tablet 101, but engine data used for printing by the print engine 208, as shown in FIGS. 16C, 17A, and 17B, may be used as data to be compared. In this case, after converting printing data into engine data, predetermined partial areas (start portion, middle portion, and end portion) of the engine data saved in the engine data buffer 218 are used to detect a difference between pieces of feature information of pages.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-210167, filed Oct. 14, 2014, which is hereby incorporated by reference herein in its entirety.

What is claimed is:

1. A printing apparatus comprising:
   a printing unit configured to perform printing based on printing data including a plurality of pages;
   a first acquisition unit configured to acquire a page count per copy;
   a second acquisition unit configured to acquire a margin size of respective pages of the page count in a first copy;
   an extraction unit configured to extract data of a predetermined portion of a printing area from the respective pages of the page count in the first copy;
   a page determination unit configured to determine whether the data of the predetermined portion extracted by said extraction unit are identical among the respective pages in the first copy; and
   a printing determination unit configured to, when said page determination unit determines that the data of the predetermined portion are identical among the respective pages, determine that printing of the printing data is not collation printing, and when said page determination unit determines that the data of the predetermined portion are not identical among the respective pages, determine that printing of the printing data is collation printing, and
   a paper feeding control unit configured to, when feeding printing paper for printing of each of pages in a second and subsequent copies after determination of said printing determination unit, control a paper feeding operation to convey preceding printing paper and succeeding printing paper so as to make the preceding printing paper and the succeeding printing paper to partially overlap each other based on the margin size acquired by said second acquisition unit,
   wherein said acquisition unit, said second acquisition unit, said extraction unit, said page determination unit, said printing determination unit and said paper feeding control unit are implemented by a processor of the printing apparatus.

2. The apparatus according to claim 1, wherein said acquisition unit acquires the page count per copy from header information of the printing data.

3. The apparatus according to claim 1, wherein said extraction unit extracts at least one of a start portion, middle portion, and end portion of the printing area within each page.

4. The apparatus according to claim 1, wherein said page determination unit compares the data of the predetermined portion of a first page out of pages of the page count per copy, with the data of the predetermined portion of another page.

5. The apparatus according to claim 1, further comprising a margin determination unit configured to determine whether the margin size acquired by said second acquisition unit is larger than a threshold,
   wherein when said margin determination unit determines that the margin size is larger than the threshold, said paper feeding control unit controls the paper feeding operation to convey the preceding printing paper and the succeeding printing paper so as to make the preceding printing paper and the succeeding printing paper to partially overlap each other.

6. The apparatus according to claim 1, wherein the margin size is at least one of a start margin length and an end margin length in a conveyance direction for each of pages of the page count per copy.

7. The apparatus according to claim 1, further comprising a storage determination unit configured to determine, based on whether the printing apparatus includes a storage unit capable of holding pages of one copy, whether said printing unit sequentially receives pages one by one from the outside and prints the pages,
wherein when the printing apparatus does not include the storage unit, said storage determination unit determines that said printing unit sequentially receives pages one by one from the outside and prints the pages.

8. A printing method to be executed in a printing apparatus comprising:
to perform printing based on printing data including a plurality of pages, comprising:
acquiring a page count per copy;
acquiring a margin size of respective pages of the page count in a first copy;
extracting data of a predetermined portion of a printing area from the respective pages of the page count in the first copy;
determining whether the data of the predetermined portion are identical among between the respective pages in the first copy; and
when it is determined that the data of the predetermined portion are identical among the respective pages, determining that printing of the printing data is not collation printing, and when it is determined that the data of the predetermined portion are not identical among the respective pages, determining that printing of the printing data is collation printing, and
when feeding printing paper for printing of each of pages in a second and subsequent copies after determination on whether printing of the printing data is collation printing or not, conveying preceding printing paper and succeeding printing paper so as to make the preceding printing paper and the succeeding printing paper to partially overlap each other based on the margin size,
wherein each processing is implemented by a processor of the printing apparatus.

9. The method according to claim 8, wherein acquiring comprises acquiring the page count per copy from header information of the printing data.

10. The method according to claim 8, wherein extracting comprises extracting at least one of a start portion, middle portion, and end portion of the printing area within each page.

11. The method according to claim 8, wherein comparing comprises comparing the data of the predetermined portion of a first page out of pages of the page count per copy, with the data of the predetermined portion of another page.

12. The method according to claim 8, further comprising determining whether the acquired margin size is larger than a threshold,
wherein when it is determined that the margin size is larger than the threshold, controlling the paper feeding operation to convey the preceding printing paper and the succeeding printing paper so as to make the preceding printing paper and the succeeding printing paper to partially overlap each other.

13. The method according to claim 8, wherein the margin size is at least one of a start margin length and an end margin length in a conveyance direction for each of pages of the page count per copy.

14. The method according to claim 8, further comprising determining, based on whether the printing apparatus includes a storage unit capable of holding pages of one copy, whether a printing unit sequentially receives pages one by one from the outside and prints the pages,
wherein when the printing apparatus does not include the storage unit, it is determined that said printing unit sequentially receives pages one by one from the outside and prints the pages.

15. A non-transitory computer-readable storage medium storing a program for causing a computer to execute steps of a method:
to perform printing based on printing data including a plurality of pages, the method comprising:
acquiring a page count per copy;
acquiring a margin size of respective pages of the page count in a first copy;
extracting data of a predetermined portion of a printing area from the respective pages of the page count in the first copy;
determining whether the data of the predetermined portion are identical among between the respective pages in the first copy; and
when it is determined that the data of the predetermined portion are identical among the respective pages, determining that printing of the printing data is not collation printing, and when it is determined that the data of the predetermined portion are not identical among the respective pages, determining that printing of the printing data is collation printing, and
when feeding printing paper for printing of each of pages in a second and subsequent copies after determination on whether printing of the printing data is collation printing or not, conveying preceding printing paper and succeeding printing paper so as to make the preceding printing paper and the succeeding printing paper to partially overlap each other based on the margin size.

* * * * *